US007254742B2

(12) United States Patent
Hayashi

(10) Patent No.: US 7,254,742 B2
(45) Date of Patent: Aug. 7, 2007

(54) DISK ARRAY DEVICE AND BATTERY OUTPUT CONTROL METHOD FOR DISK ARRAY DEVICE

(75) Inventor: Katsunori Hayashi, Odawara (JP)

(73) Assignee: Hitachi, Ltd., Tokyo (JP)

(*) Notice: Subject to any disclaimer, the term of this patent is extended or adjusted under 35 U.S.C. 154(b) by 541 days.

(21) Appl. No.: 10/899,062

(22) Filed: Jul. 27, 2004

(65) Prior Publication Data
US 2005/0270927 A1 Dec. 8, 2005

(30) Foreign Application Priority Data
Jun. 2, 2004 (JP) ............................ 2004-164007

(51) Int. Cl.
*G06F 11/00* (2006.01)
(52) U.S. Cl. .............................. 714/14; 714/22; 714/24
(58) Field of Classification Search .................. 714/14, 714/22, 24
See application file for complete search history.

(56) References Cited

U.S. PATENT DOCUMENTS

| 5,319,571 A | * | 6/1994 | Langer et al. .............. 713/300 |
| 5,341,493 A | | 8/1994 | Yanai et al. |
| 5,414,861 A | * | 5/1995 | Horning ...................... 365/229 |
| 5,557,738 A | * | 9/1996 | Townsley et al. .............. 714/14 |
| 5,675,816 A | | 10/1997 | Hiyoshi et al. |
| 5,754,868 A | * | 5/1998 | Yamamoto et al. ......... 713/300 |
| 5,845,150 A | * | 12/1998 | Henion ........................ 710/19 |
| 5,872,984 A | * | 2/1999 | Berglund et al. ........... 713/340 |
| 5,889,933 A | * | 3/1999 | Smith .......................... 714/22 |
| 5,923,099 A | * | 7/1999 | Bilir .............................. 307/64 |
| 6,816,981 B2 | | 11/2004 | Morita et al. |
| 7,152,175 B2 | * | 12/2006 | Madany et al. ............. 713/340 |
| 2001/0046118 A1 | | 11/2001 | Yamanashi et al. |
| 2003/0085622 A1 | | 5/2003 | Halley |
| 2003/0217300 A1 | | 11/2003 | Fukumori et al. |
| 2004/0068670 A1 | | 4/2004 | Suzuki et al. |
| 2005/0289393 A1 | * | 12/2005 | Bibikar et al. ................. 714/14 |

FOREIGN PATENT DOCUMENTS

| EP | 1 320 167 A1 | 6/2003 |
| EP | 1 361 516 A2 | 11/2003 |
| WO | 93/24878 | 12/1993 |

* cited by examiner

*Primary Examiner*—Bryce Bonzo
(74) *Attorney, Agent, or Firm*—Antonelli, Terry, Stout & Kraus, LLP.

(57) ABSTRACT

The disk array device supplies appropriate power to various parts in accordance with the operating mode in cases where the output of the main power supply drops. The disk array device adjusts the power from a commercial power source 6 with an AC/DC power supply 5, and supplies this power to a power supply common bus 7. A disk drive group 1 and a control circuit board group 2 constituting electrical loads are respectively connected to the power supply common bus 7. When the supply of power from the main power supply stops, the capacitor box 3 supplies a relatively large current for a short time only, in order to retain data during an instantaneous power outage. Then, the battery boxes 4 supply power to the power supply common bus 7 for a relatively long period of time, in order to perform destage control and memory backup. The battery boxes 4 perform balancing control of the output current in order to suppress variation in the output current value among the battery boxes 4.

20 Claims, 19 Drawing Sheets

DISK ARRAY DEVICE AND BATTERY OUTPUT CONTROL METHOD FOR DISK ARRAY DEVICE

CROSS-REFERENCE TO RELATED APPLICATIONS

This application relates to and claims priority from Japanese Patent Application No. 2004-164007 filed on Jun. 2, 2004, the entire disclosure of which is incorporated herein by reference.

BACKGROUND OF THE INVENTION

The present invention relates to a disk array device and a battery output control method for this disk array device.

For example, a disk array device is constructed by disposing memory devices such as hard disk drives, semiconductor memory devices or the like in the form of an array. A disk array device provides logical memory regions based on an RAID (redundant array of independent inexpensive disks). These logical memory regions are also called "logical volumes" (LU: logical units).

Host computers access the logical volumes, and perform the reading and writing (I/O) of data. The exchange of data between the host computers and logical volumes is accomplished via a memory.

Such a disk array device comprises a battery in addition to a main power supply. During normal operation, the main power supply adjusts power from a commercial power source, and supplies this power to the respective necessary parts. In the case of an emergency, the battery initiates the supply of power, and supplies the required power for a specified period of time instead of the main power supply. As a result, the operation of the disk array device can be maintained for a fixed period of time (International Disclosure No. 93/24878 Pamphlet).

In the disk array device described in the abovementioned reference, the device is constructed so that power is supplied to various parts from the battery in the case of an emergency. However, no great consideration is given to the battery output control method or the like, so that there is a possibility of problems. For example, in the case of the technique described in the abovementioned reference, the battery output temporarily drops during the destage control period in which data in the memory is saved in a memory device, so that it is conceivable that the disk array device might instantaneously stop. Thus, this technique suffers from low reliability.

SUMMARY OF THE INVENTION

Accordingly, it is one object of the present invention to provide a disk array device and a disk array device battery output control method which are devised so that electric power can be supplied to various necessary parts with higher reliability. It is another object of the present invention to provide a disk array device and disk array device battery output control method which allow a stable auxiliary output by using first auxiliary power supplies with respectively different characteristics. It is another object of the present invention to provide a disk array device and disk array device battery output control method which can accomplish a supply of power that is suitable for each of a plurality of operating modes that are performed when the main power supply is in an abnormal state, by the combined use of first auxiliary power supplies that are capable of a low output over a relatively long period of time and a second auxiliary power supply that is capable of an instantaneous large output. Other objects of the present invention will become clear from the description of embodiments given below.

In order to solve the abovementioned problems, the disk array device of the present invention comprises a host interface controller that controls the exchange of data with host devices, a slave interface controller that controls the exchange of data with memory devices, a memory part that is shared by the host interface controller and slave interface controller, a power supply line that is respectively connected to the host interface controller, slave interface controller memory part, a main power supply that is connected to the power supply line, and that supplies power to these power supply line, a plurality of first auxiliary power supplies that are respectively connected to the power supply line, and that respectively supply auxiliary power to the power supply line, and a controller that performs a control action so that the outputs of the first auxiliary power supplies are substantially uniform.

For instance, computers such as personal computers, servers, main frame computers and the like may be cited as examples of host devices. The host interface controller is an adapter that is used to perform data communications such host devices. The slave interface controller is an adapter that is used to perform data communications with memory devices. For example, hard disk drives, semiconductor memory devices, optical disk drives and the like can be used as memory devices.

Under ordinary conditions, the main power supply respectively supplies power to the respective interface controllers and memory part (hereafter referred to as "respective parts") via the power supply line. In the case of an emergency such as the occurrence of a power failure or the like, a plurality of first auxiliary power supplies respectively supply power to the respective parts via the power supply line. Battery devices can be used as these first auxiliary power supplies; for example, nickel-hydrogen batteries or the like are used.

There may be cases in which these first auxiliary power supplies have respectively different characteristics. For example, the internal impedance may be cited as an example of such characteristics. In cases where the internal impedance values of the first auxiliary power supplies are respectively different, variation occurs in the peak values of the currents that are output from the first auxiliary power supplies. Accordingly, the controller separately controls the outputs of the first auxiliary power supplies so that the auxiliary outputs from the first auxiliary power supplies are substantially uniform among the first auxiliary power supplies.

The controller can be constructed to comprise separate controllers that are respectively disposed in the first auxiliary power supplies, and a control line that connects these separate controllers. Furthermore, the separate controllers share a control signal via the control line; as a result, the separate controllers respectively control the outputs of the first auxiliary power supplies in which the controllers themselves are disposed, so that the outputs among the first auxiliary power supplies are substantially uniform.

In other words, separate controllers are disposed respectively in the respective first auxiliary power supplies, so that the outputs of the first auxiliary power supplies are separately controlled. Thus, the control function is respectively dispersed among the first auxiliary power supplies, so that output control can be performed autonomously with cooperation among the first auxiliary power supplies.

For example, the separate controllers can be constructed so that each of these controllers comprises an self-output monitoring part that monitors the output of the first auxiliary power supply in which the controller itself is disposed, an other's output monitoring part that detects control signals that are input via the control lines, a comparator that compares the monitoring results of the self-output monitoring part an the monitoring results of the other's output monitoring part, and an adjustment part that adjusts the output of the first auxiliary power supply in accordance with the results of the comparison performed by the abovementioned comparator.

Here, for example, the self-output monitoring part monitors the current value that is output from the first auxiliary power supply in which this part itself is disposed, and the other's output monitoring part monitors the current values that are output by other first auxiliary power supplies. As a result of the current value that are output from the first auxiliary power supplies being caused to appear on the control lines, the maximum current value is indicated on the control lines. Accordingly, for example, in cases where the maximum output current value is higher than the current value that is output by the separate controller's own first auxiliary power supply, this separate controller performs a control action so that the output current value of its own first auxiliary power supply is increased. Assuming that the total load of the respective parts connected to the power supply line does not fluctuate, then, as a result of an increase in the output current value of a certain first auxiliary power supply, the output current value of another first auxiliary power supply through which the maximum output current had been flowing up to this point can be lowered. As a result, the output current values of the first auxiliary power supplies can be caused to reach an equilibrium.

In cases where the power supply source is switched from the main power supply to the auxiliary power supplies, one or plurality of operating modes selected from a plurality of operating modes prepared beforehand are performed in order to protect the data stored in the disk array device. The first auxiliary power supplies supply appropriate auxiliary power in accordance with these operating modes.

Specifically, in a first case, a relatively large first auxiliary power is supplied from the first auxiliary power supplies for a relatively short first backup time. In a second case, a relatively small second auxiliary power is supplied from the first auxiliary power supplies for a relatively long second backup time. In a third case, a third auxiliary power that is smaller than the second auxiliary power is supplied from the first auxiliary power supplies for a third backup time that is longer than the second backup time.

Here, the first case corresponds to a state of instantaneous shutdown of the main power supply. For example, this is a case in which the operation of the disk array device is ensured for a relatively short time of several tens to several hundreds of milliseconds or the like. The second case corresponds to a state in which data that is stored in the memory part is saved in a memory device. For example, this is a case in which a specified operation (destage control operation) of the disk array device is ensured for a relatively long time of several minutes to several tens of minutes or the like. The third case corresponds to a state in which data stored in the memory part is held; for example, this is a case in which a specified operation (memory backup operation) of the disk array device is ensured for a longer time of several tens of hours or the like.

In the second case (destage control operation) and third case (memory backup operation), the controller can perform respective control actions so that the outputs of the first auxiliary power supplies are substantially uniform. In other words, in the first case that is used to handle a state of instantaneous shutdown of the main power supply, control that makes the outputs among the first auxiliary power supplies substantially uniform is not performed. Specifically, in the first case, the variation in the characteristics of the first auxiliary power supplies is conversely utilized in a positive manner, so that the necessary auxiliary output is obtained. On the other hand, in the second case and third case, the outputs of the first auxiliary power supplies are made substantially uniform, so that the necessary auxiliary output is stably obtained.

Internal state detectors that detect an internal state are respectively disposed in the first auxiliary power supplies, and the separate controllers can also control the outputs of the first auxiliary power supplies with consideration given to the detected internal state.

Here, the first auxiliary power supplies can be constructed so as to comprise a plurality of auxiliary power supply cells. Furthermore, the internal state detectors can detect the temperatures of the auxiliary power supply cells as [the abovementioned] internal state. The temperatures of all of the auxiliary power supply cells may be respectively detected, or the temperatures of only one or a [certain] plurality of auxiliary power supply cells may be detected. Furthermore, for example, in cases where the temperatures of the auxiliary power supply cells exceed a specified temperature, control may be performed so that the operation of the first auxiliary power supplies that have reached this high temperature is stopped, in order to prevent a decrease in the useful life.

The separate controllers can be connected to either the host interface controller or slave interface controller, or to both of these interface controllers. As a result, the states of the first auxiliary power supplies can be monitored in either the host interface controller or slave interface controller, or in both of these interface controllers. Furthermore, the interface controllers can send necessary instructions (e.g., alteration of the output target value, shutdown of output, restarting of output or the like) to the first auxiliary power supplies on the basis of these monitoring results.

In the present invention, a second auxiliary power supply that supplies auxiliary power can be disposed separately from the first auxiliary power supplies. Furthermore, a relatively large first auxiliary power can be supplied from the second auxiliary power supply for a relatively short first backup time in the first case, a relatively small second auxiliary power can be supplied from the first auxiliary power supplies for a relatively long second backup time in the second case, and a third auxiliary power that is smaller than the second auxiliary power can be supplied from the first auxiliary power supplies for a third backup time that is longer than the second backup time in the third case.

In other words, in the first case, in which the main power supply stops for a very short time, auxiliary power is supplied from the second auxiliary power supply, while in the second case and third case, auxiliary power is respectively supplied from the first auxiliary power supplies. For example, a capacitor device such as an electrolytic capacitor, electrical double-layer capacitor or the like may be cited as an example of the second auxiliary power supply.

In this case, the controller performs respective control actions so that the outputs of the first auxiliary power supplies are substantially uniform in the first case, second case and third case. In other words, control is performed so that the outputs among the first auxiliary power supplies are made substantially uniform even during the period in which auxiliary power is supplied by the second auxiliary power supply.

The plurality of first auxiliary power supplies can be constructed from a plurality of different types of first auxiliary power supplies. For example, different types of batteries such as nickel-hydrogen batteries, lead batteries, nickel-cadmium batteries, lithium batteries, fuel cells and the like can be used in combination, so that a heterogeneous battery environment is constructed.

For example, in the case of the first auxiliary power supplies, which can be constructed as battery devices, the performance such as the useful life and the like deteriorates if the internal temperature reaches a high temperature. Meanwhile, from the standpoint of reducing the size of the disk array device, it is desirable that the first auxiliary power supplies be mounted at as high a density as possible. Thus, it is necessary to strike a balance between preventing a temperature elevation and effective utilization of the installation space.

Accordingly, the first auxiliary power supplies are disposed adjacent to each other. Furthermore, air intake ports are formed in the first auxiliary power supplies in both side surfaces along the direction of disposition, and cooling fans that discharge the air taken in from the abovementioned air intake ports to the outside are respectively disposed in the respective first auxiliary power supplies. The area of the air intake ports can be set in accordance with the flow-through path of the cooling air.

The first auxiliary power supplies are disposed adjacent to each other. Air intake ports are formed in both side surfaces along the direction of adjacent installation (direction of disposition). The air that flows into the interiors of the first auxiliary power supplies from both side surfaces via the air intake ports flows through the first auxiliary power supplies while capturing heat from the auxiliary power supply cells or the like, and is discharged to the outside by cooling fans. As a result, an elevation in the temperature of the first auxiliary power supplies can be suppressed. here, the area of the air intake ports can be set in accordance with the flow-through path of the cooling air. For example, in the vicinity of the cooling fan that is position on the downstream side of the cooling air, heat is carried in from the upstream side; accordingly, there are cases in which the temperature tends to be higher here than on the upstream side. In such cases, the area of the air intake port on the downstream side is set at a larger value than that on the upstream side. As a result, the temperature inside the first auxiliary power supplies can be controlled to a substantially uniform temperature.

In a separate embodiment, the first auxiliary power supplies and the second auxiliary power supply are disposed so that both side surfaces of the second auxiliary power supply are clamped by the first auxiliary power supplies. Furthermore, air intake ports are respectively formed in the respective first auxiliary power supplies and second auxiliary power supply in both side surfaces along the direction of disposition, and a cooling fan that discharges the air that flows in through the first auxiliary power supplies to the outside is disposed in the second auxiliary power supply.

In other words, the second auxiliary power supply also acts as a common cooling mechanism for the first auxiliary power supplies that are disposed on both side surfaces of the second auxiliary power supply. Generally, the second auxiliary power supply tends to have a lower internal mounting density than the first auxiliary power supplies, so that an extra space can easily be ensured. The first and second auxiliary power supplies can be effectively cooled by utilizing this extra space as a common air duct.

BRIEF DESCRIPTION OF THE DRAWINGS

FIG. 11 is a flow chart showing the output control processing of the battery box and the like;

DESCRIPTION OF THE PREFERRED EMBODIMENTS

Embodiments of the present invention will be described below with reference to the attached figures. In the present embodiments (which will be described in greater detail below), the disk array device comprises a plurality of channel adapters (hereafter referred to as "CHAs") that respectively control the exchange of data with a plurality of host computers, a plurality of disk drive groups, a plurality of disk adapters (hereafter referred to as "DKAs") that respectively control the exchange of data with this plurality of disk drive groups, a cache memory and shared memory (control memory) that are shared by the CHAs and DKAs, a power supply common bus that is respectively connected to the abovementioned CHAs, DKAs, cache memory and shared memory, an AC/DC power supply that generates the necessary power using a commercial power source as a power supply, and that supplies power to the respective parts via the power supply common bus, one or more capacitor boxes that supply a specified power in cases where the AC/DC power supply stops for a very short time, and a plurality of battery boxes that supply a specified power in cases where the AC/DC power supply stops for a relatively long period of time.

Furthermore, in the present embodiment, an output current balancing type discharge circuit that adjusts the output current of the battery box in question in accordance with the output currents from other battery boxes is disposed in each battery box. As a result, in cases where the AC/DC power supply stops for a very short time, an instantaneous large power is output from the capacitor box, so that operation of the disk array device is ensured. In cases where the AC/DC power supply stops for a relatively long period of time, currents are output from the plurality of battery boxes instead of the capacitor box. During such long-term shutdown, for example, a destage control operation in which the memory contents of the cache memory are saved on a disk drive, or a cache memory backup operation, is performed. Here, each battery box performs mutual monitoring of the values of the output currents from the other battery boxes, and controls the values of the output currents, so that the output currents are made substantially uniform among the battery boxes.

Figure 1:
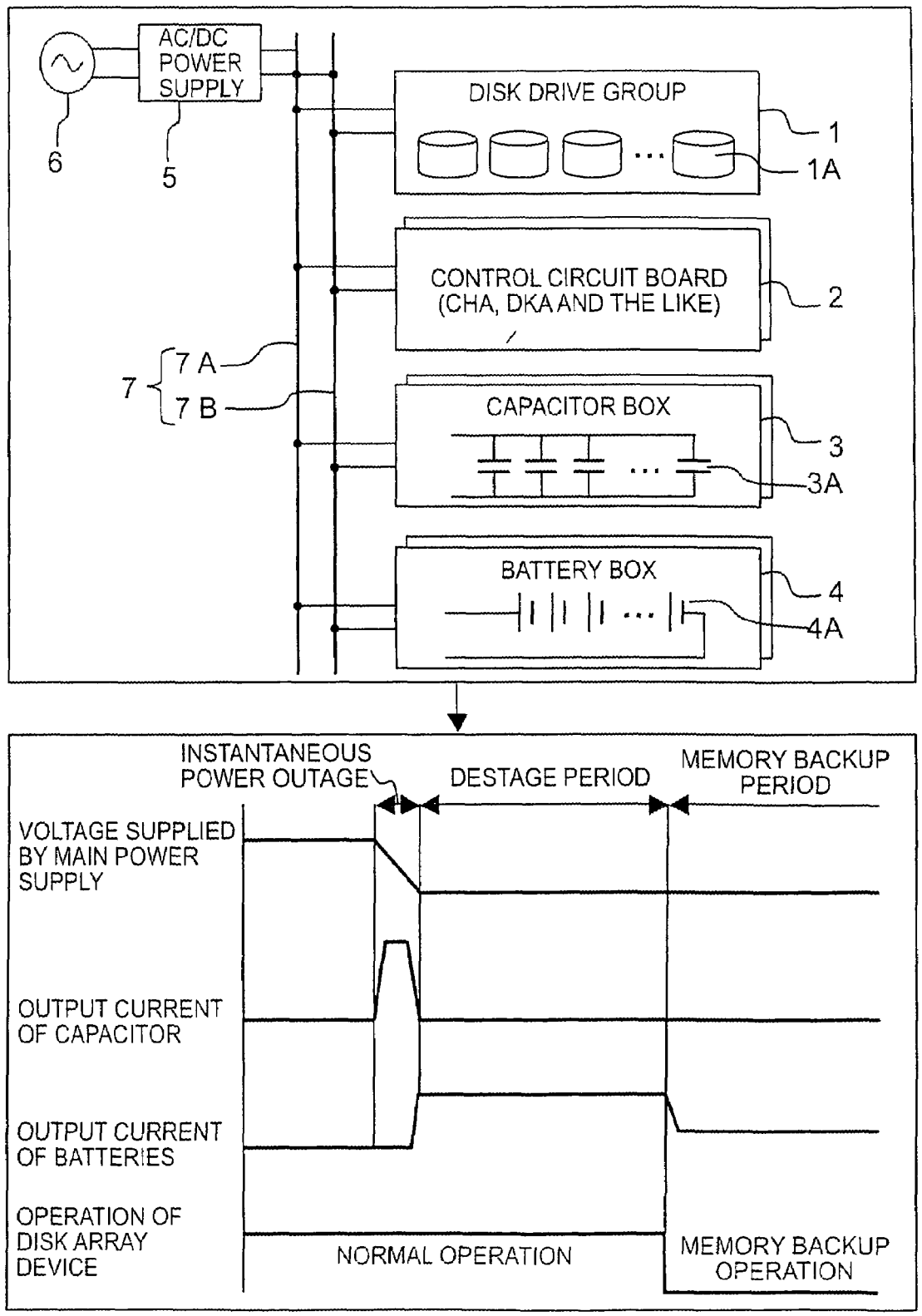
FIG. 1 is an explanatory diagram showing the schematic concept of an embodiment of the present invention.

FIG. 1 is an explanatory diagram which shows the overall schematic concept of the present embodiment in model form. As was described above, this disk array device comprises a disk drive group 1 that contains a plurality of disk drives 1A, a plurality of control circuit board groups 2 such as CHAs, DKAs and the like, one or more capacitor boxes 3 that contain a plurality of capacitors 3A, a plurality of battery boxes 4 that contain a plurality of battery cells 4A, and an AC/DC power supply 5. The disk drive group 1, control circuit boards 2, capacitor box(es) 3 and battery boxes 4 are respectively connected to a power supply common bus 7. Furthermore, the power supply common bus 7 is constructed from a plus side bus 7A and a ground side bus 7B.

The AC/DC power supply 5 is connected to a commercial power source 6. Under ordinary conditions, as is shown on the left side of the lower half of FIG. 1, the AC/DC power supply 5 converts alternating current supplied from the commercial power source 6 into a direct current that has a specified voltage value and current value, and outputs this direct current to the power supply common bus 7.

In cases where a power failure or instantaneous voltage drop occurs in the commercial power source 6, or in cases where some type of problem occurs in the AC/DC power supply 5, so that the output of the AC/DC power supply 5 falls below a specified value, a state of instantaneous shutdown results, and a power backup operation is performed.

In the case of such an instantaneous shutdown state (indicated as "instantaneous power outage" in the figures), a specified large current is instantaneously output to the power supply common bus 7 from the capacitor box 3. In other words, even if the AC/DC power supply 5 should instantaneously stop, the operation of the disk array device is ensured by a backup current from the capacitor box 3.

The capacitor box 3 supplies a large current for only a short time. In cases where the AC/DC power supply 5 stops for a time exceeding the backup time provided by the capacitor box 3, the battery boxes 4 supply a backup current instead of the capacitor box 3. During this period, data groups that are stored in the cache memory are written into a specified disk drive and saved (destage control operation). During this destage control period, the disk array device can perform data exchange using the cache memory and CHAs and DKAs.

In cases where the output of the AC/DC power supply 5 has still not recovered even after the destage control period has been exceeded, the disk array device shifts to a memory backup operation. In this memory backup operation, long-term backup of the data in the cache memory is performed, so that a quick return to ordinary operation can be accomplished when the AC/DC power supply 5 recovers. During this memory backup period, the memory contents of the cache memory are held by a low current that is output from the battery boxes 4.

Details of the disk array device according to the present embodiments will be described below. First, the external construction and a portion of the mechanical construction of the disk array device will be described; next, an outline of the block construction of the disk array device will be described. Furthermore, the circuit structure of the power supply system of the disk array device, and the control method used [in this power supply system], will be described.

1. First Embodiment

Figure 2:
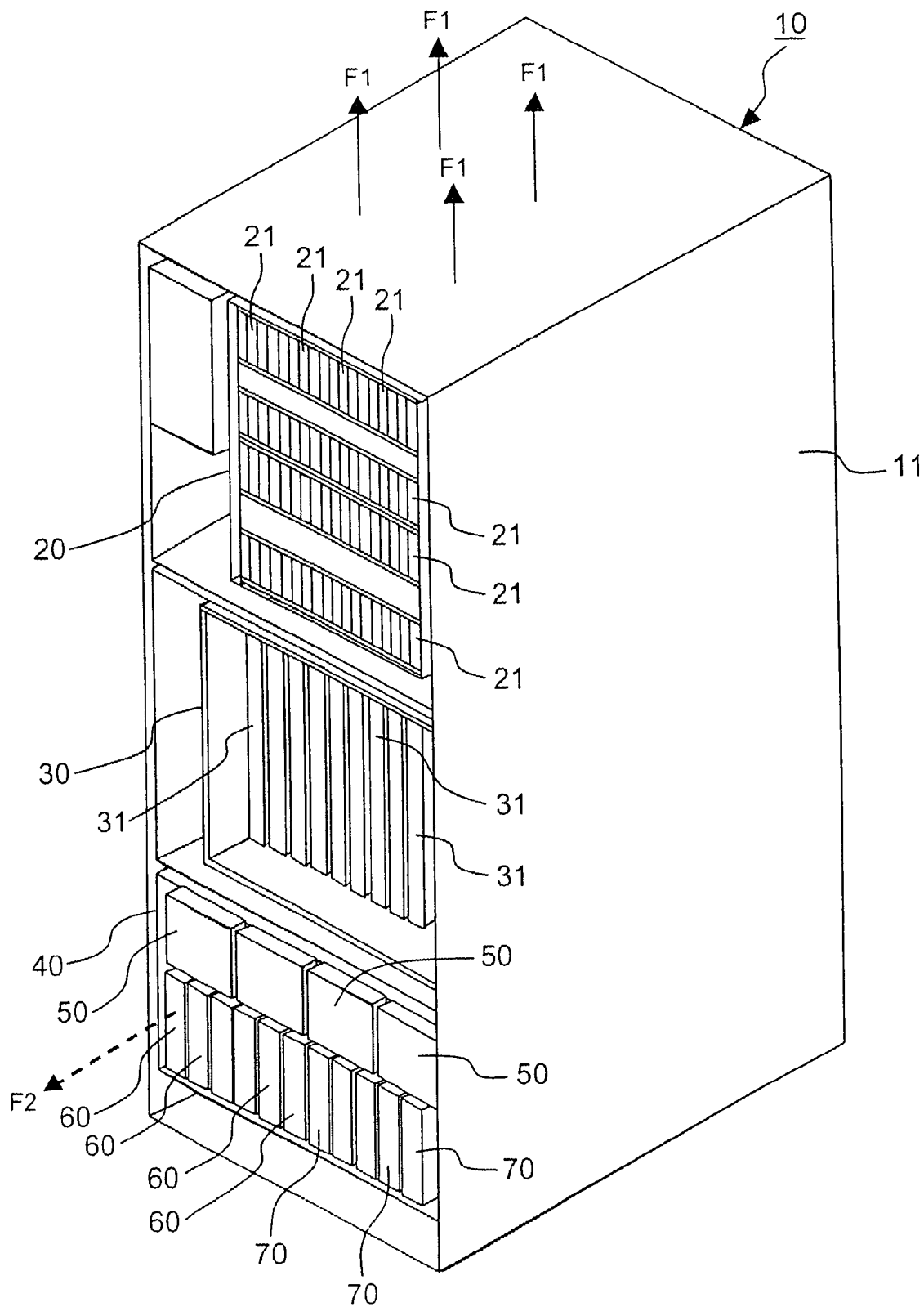
FIG. 2 is an external view of a disk array device according to a first embodiment.

FIG. 2 is an external view of the disk array device 10. The disk array device 10 can be constructed so that this disk array device comprises a housing 11, and a memory part 20, controller 30 and power supply 40 that are disposed inside this housing 11.

The memory part 20 can be disposed in the upper part of the housing 11. The memory part 20 is constructed from numerous disk drives 21 that are detachably mounted in the housing 11. For example, the disk drives 21 can be constructed as hard disk drives; however, these disk drives 21 can also be constructed as semiconductor memory devices, optical disk drives or the like.

The controller 30 can be disposed in the housing 11 so that this controller is positioned beneath the memory part 20. For example, various types of control circuit boards 31 that function as CHAs and DKAs are detachably mounted in the controller 30.

The power supply 40 can be disposed in the lowermost part of the housing 11. For example, the power supply 40 can be constructed so that this part comprises a plurality of AC/DC power supplies 50, and a plurality of battery boxes 60 and plurality of capacitor boxes 70 that are disposed beneath these AC/DC power supplies 50.

In the housing 11, memory parts 20, controllers 30 and power supplies 40 can,be disposed back to back not only on the front surface side, but also on the back surface side. A cooling air passage (not shown in the figures) that leads from the lower side toward the upper side is formed inside the housing 11, and a plurality of cooling fans (not shown in the figures) are disposed in the upper part of the h housing 11. The heat that is generated by the power supply 40, controller 30 and memory part 20 is discharged from the upper part of the housing 11 (in the direction indicated by the arrow F1) by the cooling air that flows through the cooling air passage.

Furthermore, for example, the disk drives 21, control circuit boards 31, AC/DC power supplies 50, battery boxes 60 and capacitor boxes 70 can be replaced or the like by being pulled out in the direction indicated by the arrow F2.

Figure 3:
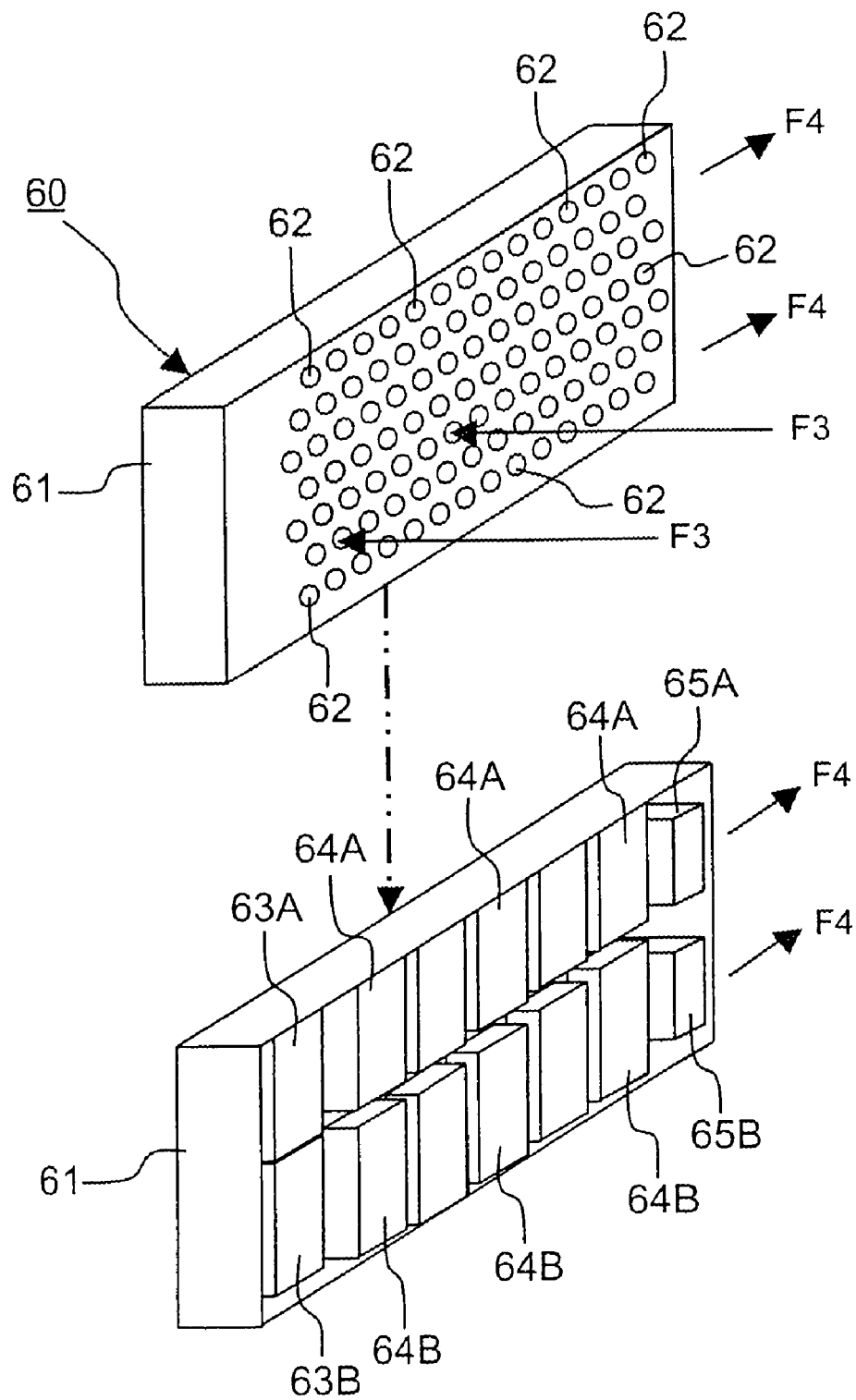
FIG. 3 is a perspective view showing the schematic structure of the battery box.

FIG. 3 is a perspective view which shows the schematic structure of the battery boxes 60 shown in FIG. 2. The battery boxes 60 can be constructed so that these battery boxes comprise a housing 61, a plurality of air intake ports 62 that are formed in both side surfaces of the housing 61, a control circuit 63 that is attached inside the housing 61, a plurality of battery circuits 64 that are attached inside the housing 61, and that are constructed so that a plurality of battery cells are connected in series, and a cooling fan 65 that is attached to the rear end side inside the housing 61.

A charging circuit 620, discharge circuit 650 and the like (described later) are included in the control circuit 63. The charging and discharging of a plurality of battery circuits 64 is controlled by one control circuit 63. A plurality of control circuits 63A and 63B (referred to collectively as the "control circuit 63"), a plurality of series of battery circuits 64A and 64B (referred to collectively as the "battery circuit 64") that are controlled by the control circuits 63A and 63B, and a plurality of cooling fans 65A and 65B (referred to collectively as the "cooling fan 65") that are respectively used to cool the series of battery circuits 64A and 64B, are respectively shown in FIG. 3.

As is shown in FIG. 3, the control circuit 63, battery circuit 64 and cooling fan 65 are disposed along the longitudinal direction of the housing 61. Numerous air intake ports 62 are formed in a surface running along a direction (direction F3) that is perpendicular to this disposition direction (direction F4) on the same plane. Outside air flows into the housing 61 from the air intake ports 62 as a result of the pressure difference that is created by the cooling fan 65. The air that flows into the housing 61 flows toward the cooling fan 65 while capturing heat from the battery circuits 64 and the like. Then, the air that has captured heat inside the housing 61 passes through the cooling fan 65 and flows into the cooling air passage formed in the housing 11 of the disk array device 10; this air is discharged to the outside from the upper part of the housing 11.

Here, the following two points are considered when the air intake ports 62 are formed. The first point is that the air intake ports 62 are not formed [only] in the front surface of the housing 61 (in the direction F2 in FIG. 1), but are rather formed on both side surfaces of the housing 61. In cases where air intake ports 62 are formed in the front surface of the housing 61, the air that flows in from the front surface of the housing 61 captures heat from the battery circuits 64 and the like while moving toward the cooling fan 65 on the rear surface side. As a result, a cooling air that has been elevated to a high temperature as a result of the capture of heat further upstream is supplied to the battery circuits 64 that are positioned on the downstream side. Accordingly, there is a possibility that the battery circuits 64 positioned on the downstream side will be insufficiently cooled; furthermore, there is a possibility that a relatively large temperature difference will be generated between the battery circuits 64. Accordingly, in the present embodiment, air intake ports 62 are respectively formed in both side surfaces of the housing 61, so that the temperature difference arising from the installation positions of the battery circuits 64 is reduced.

Figure 4:
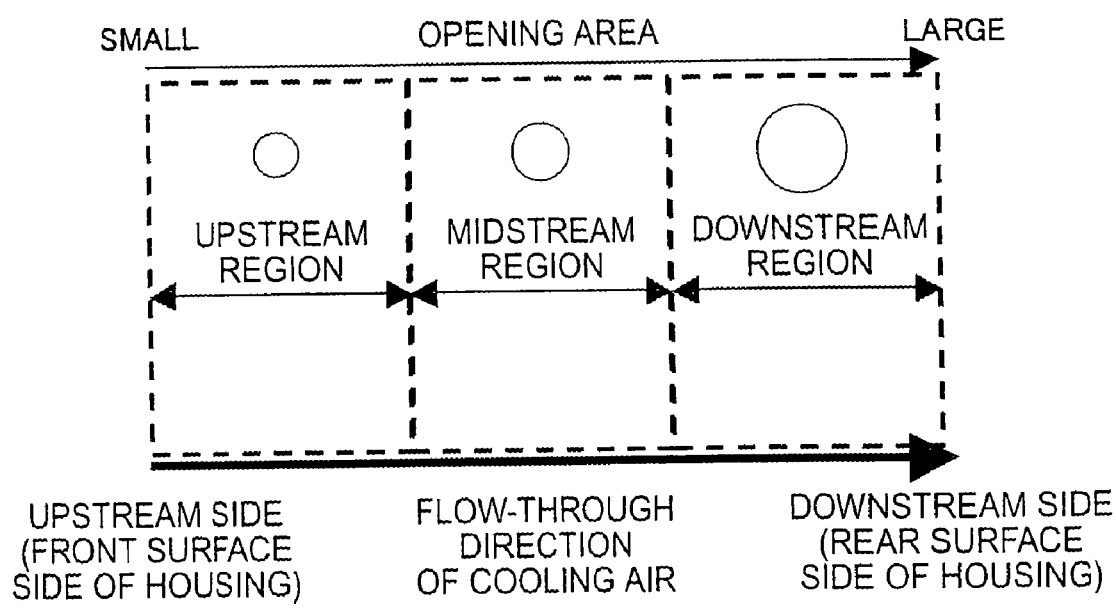
FIG. 4 is an explanatory diagram showing the method used to set the opening area of the air intake ports.

The second point is that the area of the air intake ports 62 is set in accordance with the flow-through path of the cooling air. The relationship between the opening area of the air intake ports and the flow-through path of the cooling air is shown in FIG. 4. As is shown in FIG. 4, the air intake ports 62 are formed so that the opening area increases in stages moving from the upstream side (front surface side of the housing 61) toward the downstream side (rear surface side of the housing 61) of the flowing cooling air. As a result, the heat on the upstream side can be carried away, and large amounts of fresh outside air can be taken in on the downstream side which tends to reach a relatively high temperature. Accordingly, the temperature difference generated between the battery circuits 64 can be suppressed, so that a deterioration in performance and the like can be prevented.

In FIG. 4, the opening area of the air intake ports 62 is varied in three stages, i.e., an upstream region, midstream region and downstream region. However, the present invention is not limited to this; it would also be possible to vary the opening area in two stages (e.g., upstream side from the central part and downstream side from the central part), or to adjust the opening area in four or more stages. Furthermore, it is not necessary that the shape of the air intake ports 62 be round; for example, some other shape such as a slit shape or the like may also be used. Furthermore, in the present embodiment, a description is given using a case in which the battery boxes 60 and capacitor boxes 70 are air-cooled as an example. However, the present invention is not limited to this; it would also be possible to cool either the battery boxes 60 or capacitor boxes 70, or both, by means of some other cooling structure such as water cooling or the like.

Figure 5:
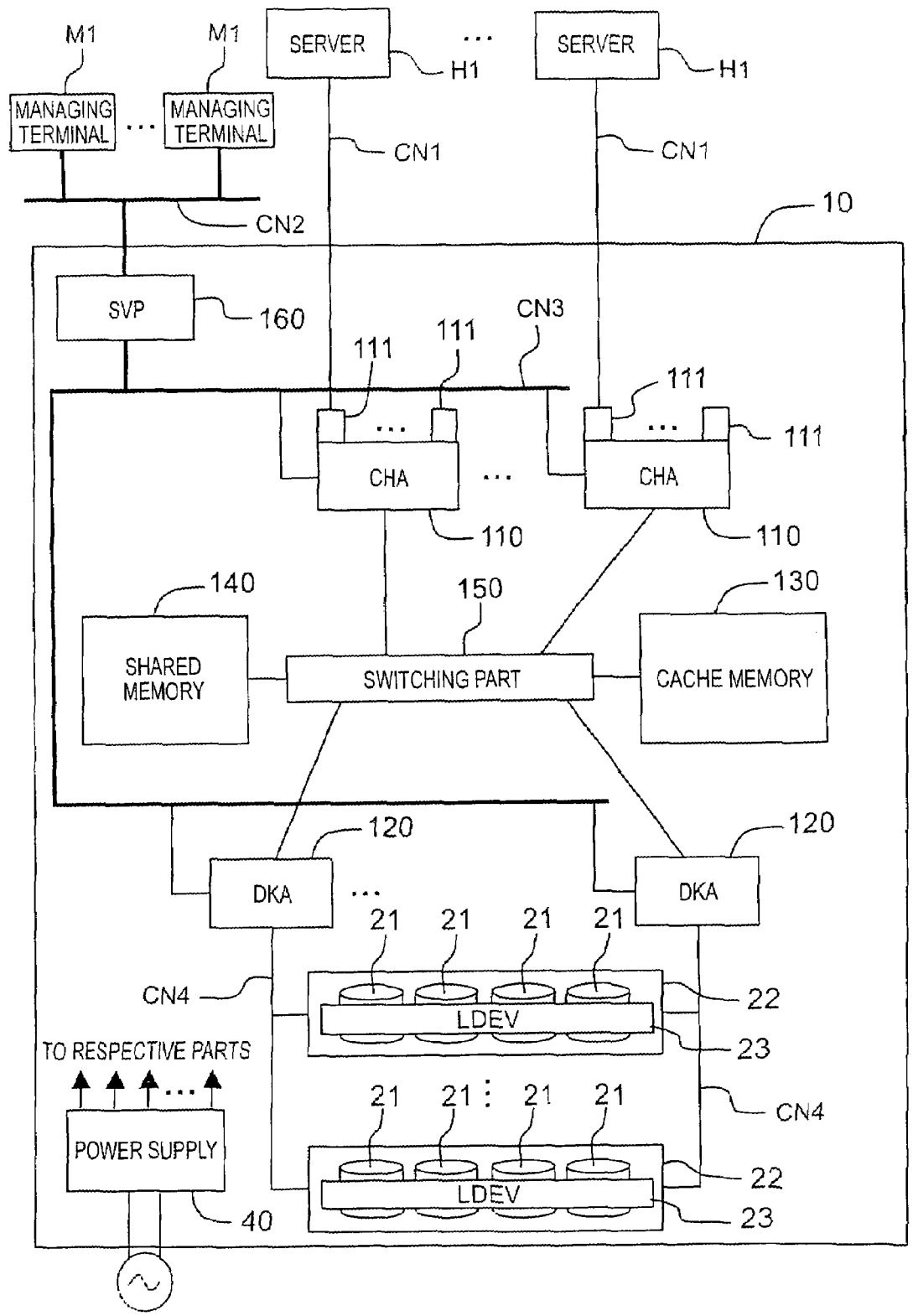
FIG. 5 is a functional block diagram of the disk array device.

FIG. 5 is a block diagram which focuses on the functional construction of the disk array device 10. The disk array device 10 can be connected to a plurality of host computers H1 via a communications network CN1.

For example, the communications network CN1 is a LAN, SAN, internet, dedicated circuit or the like. In cases where a LAN is used, data transfer between the host computers H1 and disk array device 10 is performed according to TCP/IP. In cases where a SAN is used, the host computers H1 and disk array device 10 use a fiber channel protocol. Furthermore, in cases where the host computers H1 are main frame computers, data transfer is performed according to a communications protocol such as (for example) FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

For example, the host computers H1 are realized as servers, personal computers, workstations, main frame computers or the like. For example, the host computers H1 are connected to a plurality of client terminals positioned outside the figures via a separate communications network. For instance, the host computers H1 provide services to the client terminals by performing the reading or writing of data in the disk array device 10 in response to requests from the client terminals.

The CHAs 110 control the transfer of data with the host computers H1, and comprise communication ports 111. A plurality of CHAs 110 can be installed in the dad 10. For example, the CHAs 110 are provided in accordance with the type of host computer H1, such as open type CHAs, main frame type CHAs or the like.

The CHAs 110 receive data and commands for the reading and writing of data from the respectively connected host computers H1, and operate in accordance with such commands received from the host computers H1.

This will be described in advance, including the operation of the DKAs 120. First, when [one of] the CHAs 110 receives a read command from a host computer H1, this read command is stored in the shared memory 140. The DKAs 120 occasionally refer to the shared memory 140, an when an unprocessed read command is discovered, the data [in question] is read out from the disk drive 21, an is stored in the cache memory 130. The CHA 110 reads out the data that has been transferred to the cache memory 130, and transmits this data to the host computer H1.

Meanwhile, when the CHA 110 receives a write command from the [abovementioned] host computer H1, this write command is stored in the shared memory 140. Furthermore, the CHA 110 stores the received data (user data) in the cache memory 130. After storing the user data in the cache memory 130, the CHA 110 reports the completion of writing to the host computer H1. In accordance with the write command stored in the shared memory 140, the DKA 120 reads out the data stored in the cache memory 130, and stores this data on a specified disk drive 21. Here, user data that is stored only in the cache memory 130 is called "dirty data", and data that is stored in both the cache memory 130 and disk drive 21 is called "clean data".

A plurality of these DKAs 120 can be installed in the disk array device 10. The DKAs 120 respectively control data communications with the disk drives 21. For example, the DKAs 120 and the disk drives 21 are connected via a communications network CN4 such as a SAN or the like, and the transfer of data in block units is performed according to a fiber channel protocol. The DKAs 120 occasionally monitor the states of the disk drives 21, and the results of this monitoring are transmitted to an SVP 160 via an internal network CN3.

Furthermore, the CHAs 110 and DKAs 120 are constructed as control circuit boards respectively comprising a printed board on which a processor, memory and the like are mounted, and a control program that is stored in the memory (neither of these is shown in the figures), and respective specified functions are realized by the cooperative action of this hardware and software.

For example, the cache memory 130 stores user data and the like. For instance, the cache memory 130 can be constructed from a nonvolatile memory; however, this cache memory can also be constructed from a volatile memory. In the following description, a case in which all or part of the cache memory 130 is constructed from a volatile memory will be taken as an example.

For instance, the shared memory (or control memory) 140 can be constructed from a nonvolatile memory; however, this shared memory can also be constructed from a volatile memory. For example, control information, management information and the like are stored in the shared memory 140. This information such as control information and the like can be multiplex-managed by a plurality of shared memories 140. A plurality of both shared memories 140 and cache memories 130 can be installed. Furthermore, the cache memory 130 and shared memory 140 can also be mounted in a mixed configuration on the same memory board. Alternatively, a portion of a single memory can be used as a cache region, and another portion of this memory can be used as a control region.

The switching part 150 respectively connects the CHAs 110, DKAs 120, cache memory 130 and shared memory 140. As a result, all of the CHAs 110 and DKAs 120 can respectively access the cache memory 130 and shared memory 140. For example, the switching part 150 can be constructed as an ultra-high-speed cross bar switch or the like.

The disk drives 21 are physical memory devices. For example, RAID groups 22 that constitute virtual logical regions are constructed on physical memory regions provided by disk drives 21 in which four drives form one set (although this varies according to the RAID construction and the like). Furthermore, one or more virtual logical units (LU) 23 can be set on the RAID groups 22.

Furthermore, it is not necessary that all of the memory resources used by the disk array device 10 be disposed inside the disk array device 10. The disk array device 10 may take in and utilize memory resources that are present outside the disk array device 10 as though these memory resources were its own memory resources.

The service processor (SVP) 106 is respectively connected to the CHAs 110 and DKAs 120 via an internal network CN3 such as a LAN or the like. Furthermore, the SVP 160 can be connected to a plurality of management terminals M1 via a communications network CN2 such as a LAN or the like. As will be described later, the SVP 160 collects various types of internal states inside the disk array device 10, including the state of the power supply 40, and supplies these states to the management terminals M1.

The power supply 40 supplies power to the respective parts requiring power, such as the abovementioned CHAs 110, DKAs 120, cache memory 130 an the like via the power supply common bus.

Figure 6:
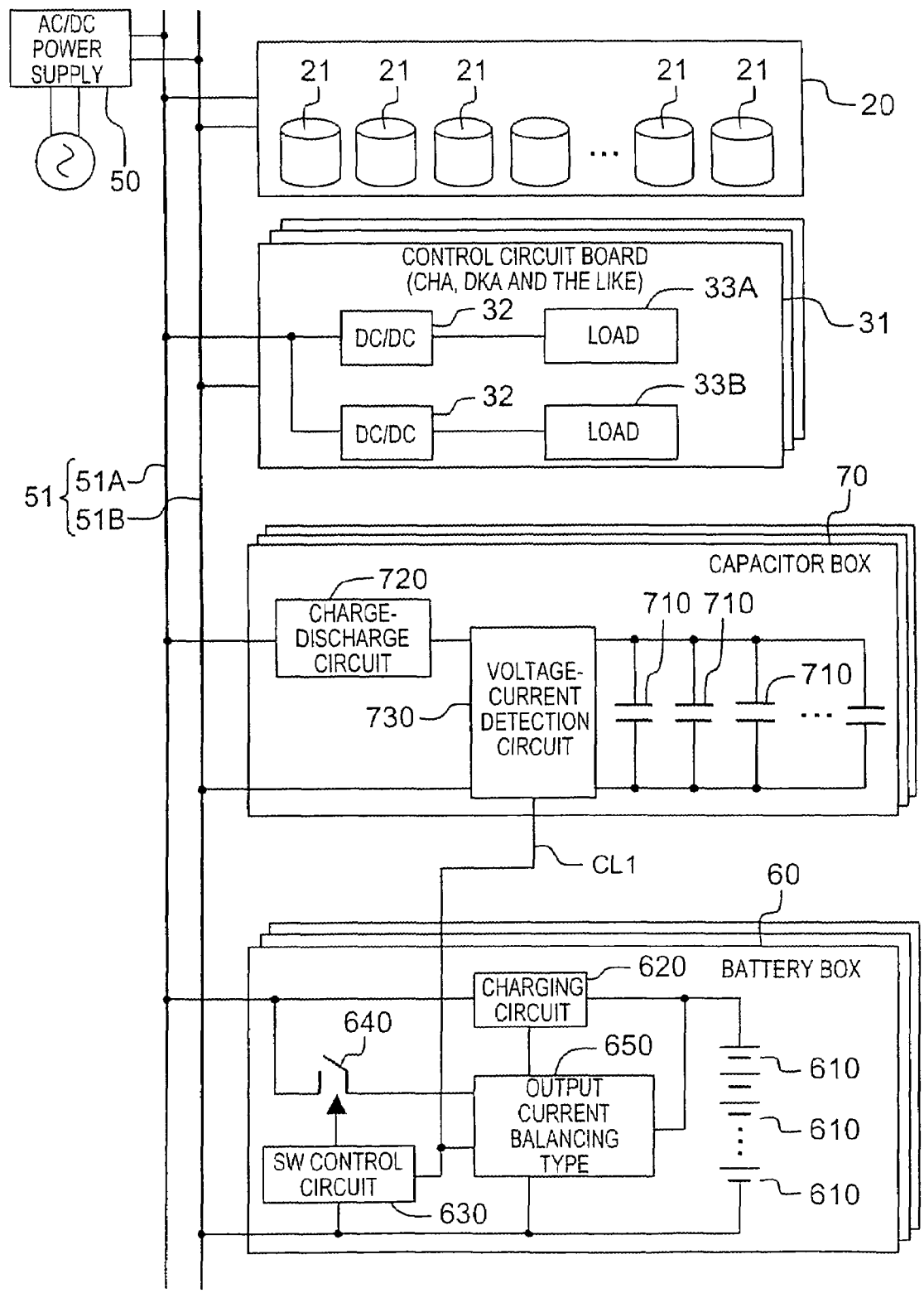
FIG. 6 is a circuit diagram focusing on the power supply circuit of the disk array device.

FIG. 6 is a schematic circuit diagram that focuses on the power supply system. The AC/DC power supplies 50 are connected to a power supply common bus 51. The bus 51A is a plus side bus, and the bus 51B is a ground side bus. Only one AC/DC power supply 50 is shown in the figures.

The disk drives 21 of the memory part 20 are connected to the power supply common bus 51, so that the necessary power can be obtained via the power supply common bus 51. The control circuit boards 31 are control package boards that respectively realize the abovementioned CHAs 110, DKAs 120, cache memory 130 and the like. Specifically, these boards are packaged according to the respective functions, with CHA boards realizing the functions of the CHAs 110, DKA boards realizing the functions of the DKAs 120, cache memory boards mounting the cache memories 130 and the like.

For instance, a description will be given below using a case in which the control circuit boards 31 are either CHA boards or DKA boards as an example. The control circuit boards 31 comprise a plurality of DC/DC converters 32, and a plurality of different types of loads 33A and 33B (referred to collectively as the "load 33"). For example, one load 33A is a load such as a CPU (central processing unit), LSI (large scale integration) or the like, while the other load 33B is some other general logical circuit or the like. Since the loads 33A and 33B have respectively different operating voltages, DC/DC converters 32 corresponding to the loads 33A and 33B are mounted on the control circuit boards 31. For example, a direct-current power of approximately 8 V to 12 V is supplied to the power supply common bus 51. For example, the DC/DC converters 32 convert the power supplied from the power supply common bus 51 into a direct-current power of approximately 3.3 V, and supply this power to the load 33.

Figure 7:
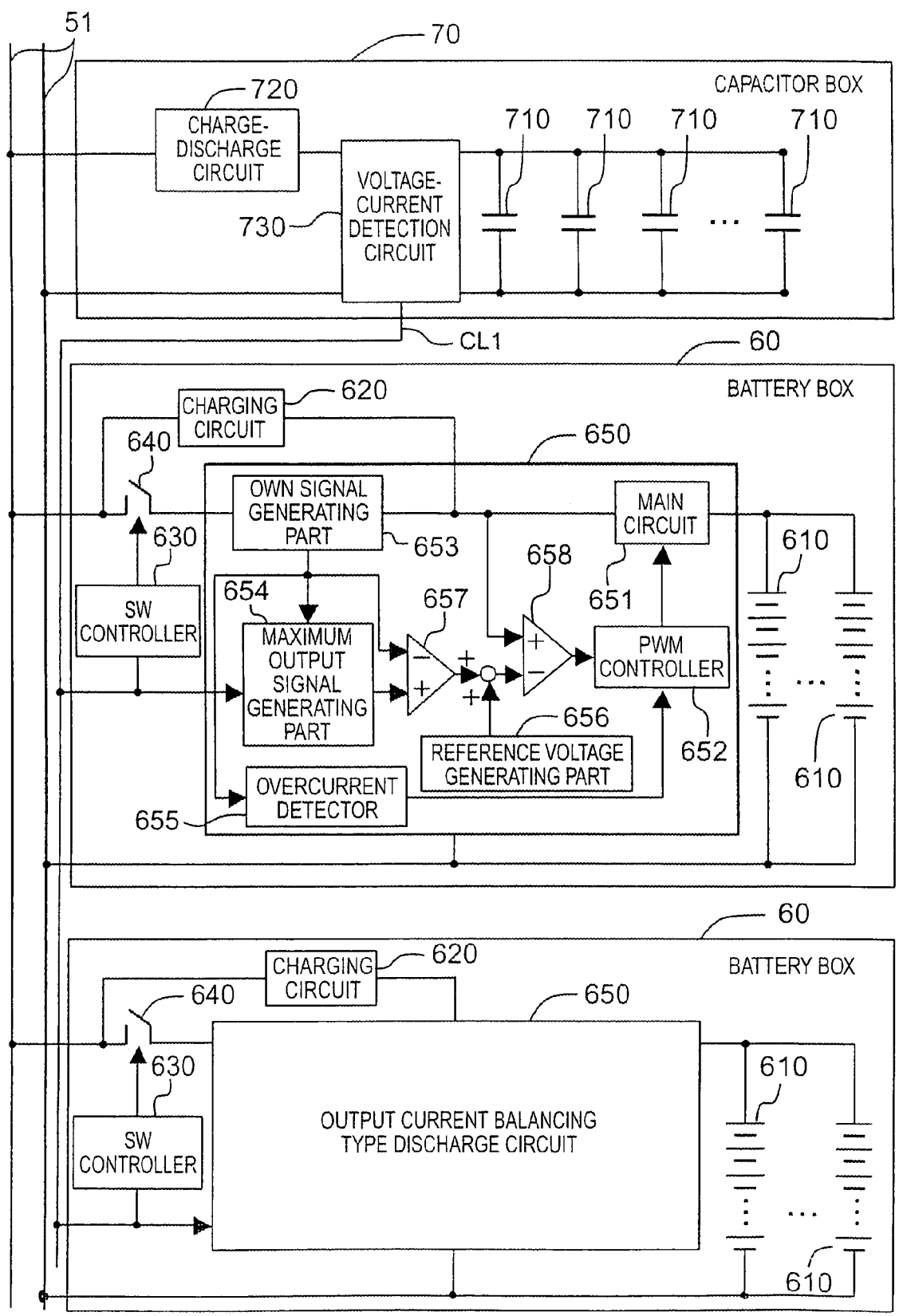
FIG. 7 is a circuit diagram showing the circuit construction of the battery box.

The battery boxes 60 can be constructed so that these battery boxes comprise a plurality of secondary cells 610, a charging circuit 620, a switching control circuit ("SW control circuit" in the figures) 630, a switch 640, and a discharge circuit 650. For example, the secondary cells 610 are constructed as nickel-hydrogen secondary cells. One battery cell is constructed by connecting a plurality of secondary cells 610 in series. Furthermore, as is shown in FIG. 7, a plurality of battery cells are connected in parallel. Because of space limitations, only a single battery cell is shown in FIG. 6; in actuality, however, a plurality of battery cells can be installed.

The charging circuit 620 adjusts the power that is supplied from the power supply common bus 51, and charges the battery cells. The switching control circuit 630 controls the connection between the discharge circuit 650 and the power supply common bus 51. Specifically, a discharge control switch 640 is disposed between the output terminal of the discharge circuit 650 and the power supply common bus 51, and the switching control circuit 630 controls the opening and closing of this discharge control switch 640. The switching control circuit 630 detects the period of output from the capacitor boxes 70 by monitoring the current value that appears on the control line CL1.

Furthermore, during ordinary operation in which power is supplied from the AC/DC power supply 50 and during an instantaneous power outage in which power is supplied from the capacitor boxes 70, the switching control circuit 630 opens the discharge control switch 640, so that the discharge circuit 650 is cut off from the power supply common bus 51. Furthermore, during the final stage of an instantaneous power outage, and during the destage control period and memory backup period, the switching control circuit 630 closes the discharge control switch 640, so that the discharge circuit 650 and power supply common bus 51 are connected. Thus, the switching control circuit 630 controls the opening and closing of the discharge control switch 640 so that the discharge circuit 650 and power supply common bus 51 are connected only during periods in which power is supplied to the power supply common bus 51 from the discharge circuit 650.

The discharge circuit 650 supplies power to the disk drives 21 and control circuit boards 31 by outputting the power accumulated in the battery cells to the power supply common bus 51. The discharge circuit 650 is connected to the control line CL1 that is respectively connected to the capacitor boxes 70 and other battery boxes 60. As a result, as will be described later with reference to FIG. 7, the discharge circuit 650 compares the value of the maximum current appearing on the control line CL1 with its self-output current value, and performs a control action so that the difference between the two values is eliminated. Specifically, the discharge circuit 650 of the present embodiment is not a circuit that performs only a simple discharge, but also has an output current balancing function that autonomously controls the output current. Details of the discharge circuit 650 will be described later with reference to FIG. 7.

The capacitor boxes 70 can be constructed so that these capacitor boxes comprise a plurality of capacitors 710, a charge-discharge circuit 720, and a voltage-current detection circuit 730. For example, the capacitors 710 can be constructed from electrolytic capacitors, electrical double-layer capacitors or the like. A specified large current is obtained by connecting numerous capacitors 710 in parallel. The charge-discharge circuit 720 is a circuit that respectively performs charging of the capacitors 710 and discharging from the capacitor 710. The voltage-current detection circuit 730 is a circuit that outputs the values of the current output from capacitors 710 to the control line CL1 as a part of the control signals. The battery boxes 60 can detect the fact that a discharge has been performed from the capacitor boxes 70 from the large current value that appears on the control line CL1.

Furthermore, in FIG. 6, a plurality of capacitor boxes 70 are shown; however, it is sufficient if at least one capacitor box 70 is installed. However, from the standpoint of improving reliability by providing redundancy, it is desirable to install a plurality of capacitor boxes 70.

FIG. 7 is a circuit diagram showing a more detailed example of the circuit shown in FIG. 6. A plurality of battery boxes 60 are respectively connected in parallel to the power supply common bus 51. The details of the discharge circuits 650 of the battery boxes 60 will be described here. Each discharge circuit 650 can be constructed so that this circuit comprises a main circuit 651, a PWM (pulse width modulation) controller 652, an own-signal generating part 653, a maximum output signal generating part 654, an overcurrent detector 655, a reference voltage generating part 656, and a plurality of operational amplifiers 657 and 658.

The main circuit 651 is constructed so that this circuit includes a switching element. The PWM controller 652 controls the operating time of the switching element by varying the width of the control pulse that is input into the main circuit 651. In accordance with this control signal from the PWM controller 652, the main circuit 651 performs switching output. The current from each battery cell is output to the power supply common bus 51 from the main circuit 651 via the discharge control switch 640.

The value of the current that is output from the main circuit 651 is detected by the own-signal generating part 653. Specifically, the own-signal generating part 653 is a circuit that is used to detect the value of the current that is output from the discharge circuit 650. The maximum output signal generating part 654 is connected to the control line CL1, and is a circuit that is used to detect the current value that appears on the control line CL1. As was described above, the control line CL1 is respectively connected to the battery boxes 60 and the capacitor boxes 70, and the maximum value among the current values that are output from these battery boxes 60 and capacitor boxes 70 appears on the control line CL1.

The output current value from the own-signal generating part 653 and the output current value from the maximum output signal generating part 654 re respectively input into the first operational amplifier 657. The first operational amplifier 657 compares these current values, and outputs the difference between the two values.

A signal obtained by adding the reference voltage from the reference voltage generating part 656 to the output signal from the first operational amplifier 657 is input into the second operational amplifier 658 as one input signal. A signal based on the output current from the main circuit 651 is input into the second operational amplifier 658 as the other input signal. The second operational amplifier 658 outputs the difference between these input signals to the PWM controller 652. On the basis of the signal that is input from the second operational amplifier 658, the PWM controller 652 adjusts the control signal (control pulse width) that is input into the main circuit 651.

In other words, on the basis of the difference between the value of the current that is output by the discharge circuit 650 itself and the current value that appears on the control line CL1, the discharge circuit 650 shown in FIG. 7 controls the output current in the direction that eliminates this difference. Only the largest value among the current values that are output from the battery boxes 60 appears on the control line CL1. Accordingly, the discharge circuits 650 of the battery boxes 60 increase their self-outputs so that the difference between these outputs and the maximum current values disappears. Specifically, each battery box 60 independently and autonomously controls the value of its self-output current so that a balance is struck with the other battery boxes 60.

In cases where the total quantity of the electrical load that is connected to the power supply common bus 51 is fixed, if control is performed so that a balance is struck in the output current values among the battery boxes 60, then the battery box 60 that has been outputting the maximum current up to this point performs PWM control in a direction that lowers its self-output current. If the total amount of the required current is fixed, an increase in the output current values from the other battery boxes 60 makes it possible for the battery box 60 that has been outputting the maximum current value up to this point to lower its self-output current value.

Thus, in the present embodiment, control circuits that cause the output current values to reach an equilibrium are respectively mounted in the battery boxes 60. For example, the control circuits that cause these output currents to reach an equilibrium can be constructed from an own-signal generating part 653, a maximum output signal generating part 654 and a first operational amplifier 657.

Furthermore, as is shown in the figures, these control circuits that cause the output currents to reach an equilibrium can be constructed as integral parts of the discharge circuits. Each battery box 60 performs autonomous control so that no variation is generated in the output current values among the battery boxes 60.

As a result, the sum of the current values output from the battery boxes 60 agrees with the current value required by the disk array device 10 in the current operating mode. Accordingly, the output of a current greater than necessary by certain battery boxes 60 only, or insufficient current output by other battery boxes 60, can be prevented. As a result, the operations among the battery boxes 60 are caused to reach an equilibrium, so that a non-equilibrium of the temperatures of the battery cells arising from differences in the output current values is prevented, thus making it possible to prevent a decrease in the useful life of the battery cells.

Furthermore, the overcurrent detector 655 is a safety circuit that judges whether or not the value of its self-output current has reached a specified overcurrent value. For example, in cases where an excessively large current is output as a result of short-circuiting of the circuits or trouble in the elements, the PWM controller 652 is immediately notified of this by the overcurrent detector 655, and the value of the output current is lowered.

Figure 8:
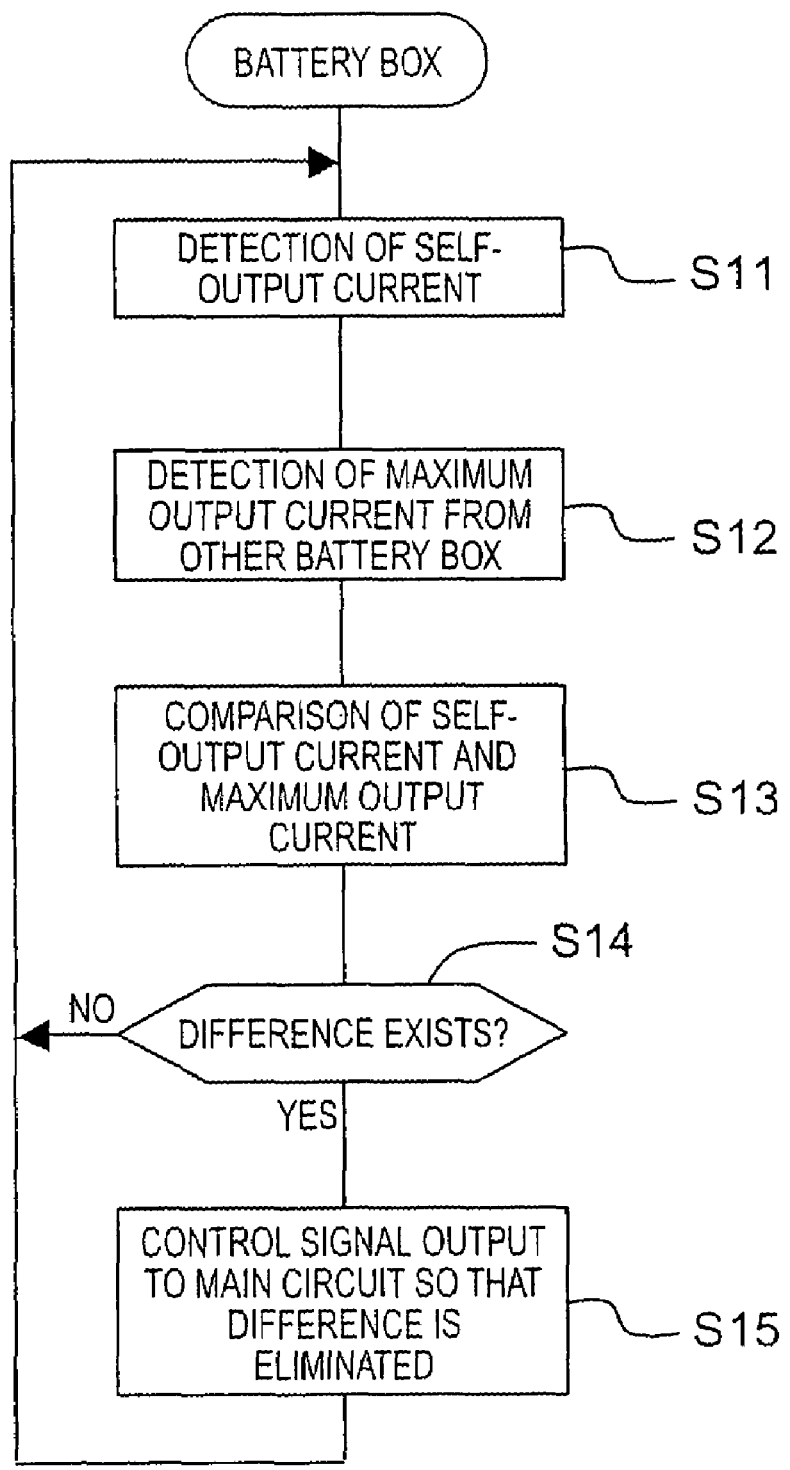
FIG. 8 is a flow chart showing the flow of output current balancing control.

FIG. 8 is a flow chart showing the flow of the autonomous output current balancing processing performed by the battery boxes 60. As was described above, this processing can be constructed from hardware circuits alone. However, the present invention is not limited to this; micro-computers or control blocks can be mounted in the battery boxes 60, and the output current balancing processing can be realized by the cooperative action of software and hardware.

First, each battery box 60 detects the value of its self-output current (S11). In the example shown in FIG. 7, the own-signal generating part 653 corresponds to S11. Next, each battery box 60 detects the maximum current value among the current values that are being output from the other battery boxes 60 (S12). In the example shown in FIG. 7, the control line CL1 and maximum output signal generating part 654 correspond to S12.

Each battery box 60 compares the value of its self-output current and the value of the maximum output current (S13), and judges whether or not a difference has been generated between the two values (S14). In the example shown in FIG. 7, the first operational amplifier 657 corresponds to S13 and S14. In cases where a difference is generated between the two current values (S14: YES), each battery box 60 outputs a control signal to the main circuit 651 so that this difference is eliminated (S15). In the example shown in FIG. 7, the second operational amplifier 658 and the PWM controller 652 correspond to S15.

Figure 9:
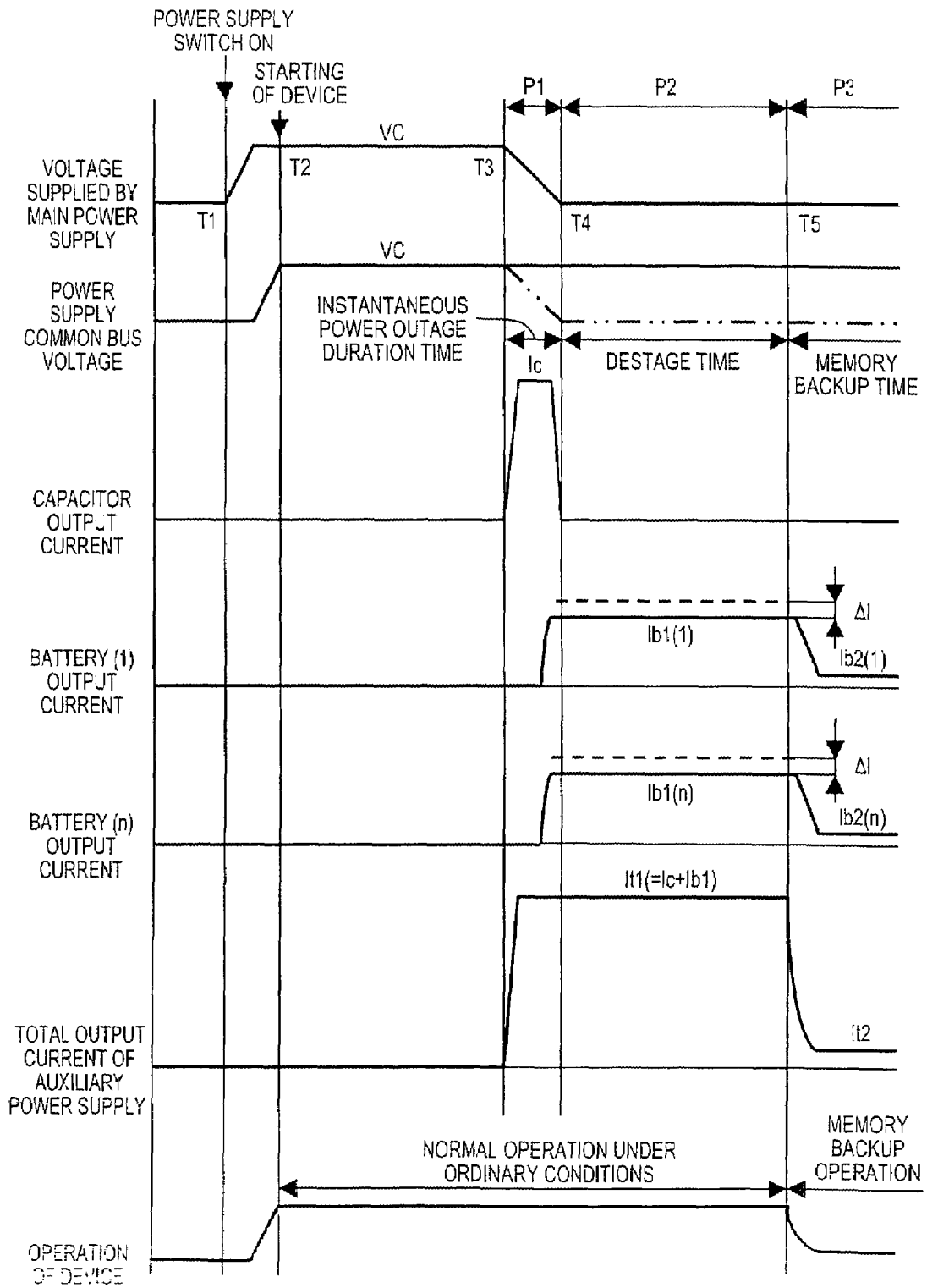
FIG. 9 is a timing chart of power supply backup.

Next, FIG. 9 is a timing chart which shows an outline of the power supply control of the disk array device 10. First, at time T1, the manager of the disk array device 10 switches on the switch of the main power supply. As a result, the AC/DC power supplies 50 adjust the power supplied from a commercial power source, and initiate the supply of power to the power supply common bus 51.

At time T2, when the power supplied by the AC/DC power supplies 50 reaches a specified value VC, the disk array device 10 is started. For example, after completing various, initial settings, the disk array device 10 processes access requests from the host computers H1.

At time T3, it is assumed that the outputs of the AC/DC power supplies 50 drop due to some cause such as a power outage, temporary voltage drop or the like. In cases where the voltage of the power supply common bus 51 drops, a holding operation for an instantaneous power outage is first performed. When the capacitor box(es) 70 detect a voltage drop of the power supply common bus 51, the charges accumulated in the capacitors 710 are supplied to the power supply common bus 51 via the charge-discharge circuit 720. The output current Ic from the capacitor box(es) 70 is supplied to respective parts via the power supply common bus 51. Generally, the output of the capacitors 710 is completed in a short time, and the output from the capacitor box(es) 70 stops at time T4.

The period P1 extending from time T3 at which the outputs of the AC/DC power supplies 50 drop to the time T4 at which the output from the capacitor box(es) 70 stops is the instantaneous power outage holding time. During this period P1, the operation of the disk array device 10 is performed by the output current from the capacitor box(es) 70. Accordingly, in cases where the drop in the output voltages of the AC/DC power supplies 50 is limited to a drop for a very short time, the backup power supply of the disk array device 10 can be constructed using only the capacitor box(es) 70.

However, in cases where the drop in the outputs of the AC/DC power supplies 50 still does not recover even though the period P1 has elapsed, the disk array device 10 initiates destage control operation at time T4 in order to maintain the safety of the data. This destage control is processing that writes data that has not been written into the disk drives 21 (dirty data) among the data groups stored in the cache memory 130 into the disk drives 21, and thus saves this data.

Thus, in the case of destage control, the data in the cache memory 130 must be written into a disk drive 21. Accordingly, a relatively long time of (for example) several minutes to several tens of minutes is required for destage control (although this varies according to the amount of data that is saved, the speed of access to the disk drive 21 and the like). Furthermore, since it is necessary to drive a plurality of disk drives 21, the load also tends to be increased, so that a relatively large current is required.

Accordingly, in the destage control period P2 that begins at time T4, power supply backup by the battery boxes 60 is started instead of [backup by] the capacitor box(es) 70. The battery boxes 60 each output a current Ib.

Here, as was described above, each battery box 60 controls its self-output while monitoring the outputs from the other battery boxes 60. Accordingly, even in cases where there is a variation in impedance or the like among the battery boxes 60, the output current values are substantially constant among the battery boxes 60.

The backup of the power supply by the battery boxes 60 is initiated prior to the shift from the instantaneous power outage holding period P1 to the destage control period P2. The battery boxes 60 begin to output a current at an intermediate stage or during the final stage of the instantaneous power outage holding period P1. As a result, at least two effects can be obtained. First, the drop in current that occurs in the final stage of the discharge of the capacitor box(es) 70 can be compensated for by the output currents from the battery boxes 60. Secondly, some amount of time is required for the values of the output currents of the battery boxes 60 to reach the constant value Ib; however, since the discharges from the battery boxes 60 are initiated prior to the shift to the destage control period P2, the output current values in the destage control period P2 can be quickly stabilized.

Furthermore, ΔI in the figures indicates the current margin that is required in cases where alarm signals are output form the battery boxes 60.

In cases where the outputs of the AC/DC power supplies 50 do not recover during the destage control period, destage control is ended at time T5; then, memory backup control is initiated. This memory backup control is control that supplies the current that is required for the cache memory 130 (and if necessary, the shared memory 140 as well) to hold data. Accordingly, the necessary current value is smaller than in the case of destage control.

When a shift is made to memory backup control, the battery boxes 60 lower the value of the output current to Ib2 (Ib2<Ib1). As a result, for example, the memory contents of the cache memory 130 are held for a long period of time, i.e., several tens of hours. In cases where the outputs of the AC/DC power supplies 50 do not recover within this memory backup period P3, ordinary service can quickly be provided using the data in the cache memory 130.

As is shown in the lower part of FIG. 9, the total output current value It of the auxiliary power supply (battery boxes 60 and capacitor box(es) 70) can be determined as the sum of the values Ic of the current(s) output from the capacitor box(es) 70 and the values Ib of the currents output from the battery boxes 60. During the instantaneous power outage holding period P1 and destage control period P2, the ordinary normal operation of the disk array device 10 is ensured by the output current(s) from the capacitor box(es) 70 and the output currents from the battery boxes 60.

In cases where the drop in the output of the AC/DC power supplies 50 is prolonged for a long period of time, there is a shift to the memory backup mode, and specified low currents from the battery boxes 60 are supplied to the cache memory 130 via the power supply common bus 51.

Furthermore, in the figures, a case is shown for example in which the operating modes of the disk array device 10 shift in the order of instantaneous power outage holding operation (period P1), destage control operation (period P2) and memory backup operation (period P3). However, the present invention is not limited to this; for example, it would also be possible to shift to the memory backup operation following the instantaneous power outage holding operation. Furthermore, other operating modes may also be added.

In the present embodiment, as a result of the use of the abovementioned construction, the following effects are obtained. First, a construction is used in which power supplies of a plurality of different types with completely different discharge characteristics are connected, i.e., capacitor box(es) 70 that can supply an instantaneous large current, and battery boxes 60 that can supply current over a relatively long period of time. Accordingly, the auxiliary power supply can be used differently in accordance with the current characteristics (magnitude of the current value, and backup time) required in the respective operating modes of the disk array device 10.

Specifically, in the present embodiment, the system is constructed so that the capacitor box(es) 70 are used in the case of the instantaneous power outage holding operation which requires an instantaneous large current, and so that the battery boxes 60 that are capable of a long-term current output are used in the case of the destage control operation or memory backup operation which require long-term backup. As a result, since the battery boxes 60 do not require the output of an instantaneous large current, the energy volume that is required can be reduced. Accordingly, the battery boxes 60 can be constructed using relatively inexpensive battery cells, so that the cost of the disk array device 10 can be reduced.

In the present embodiment, a construction is used in which a control function for the purpose of autonomous control of the output current values among the battery boxes 60 is respectively disposed in each of the battery boxes 60. The peak values of the currents that are output from the battery boxes 60 can be made substantially uniform by means of this output current balancing control function. Accordingly, there is no need to determine the specifications of the electrical circuits with consideration give to the occurrence of excessively large peak currents. Therefore, for example, the rated power values required in respective parts such as connectors, cables, printed wiring patterns, resistors and the like can be lowered. As a result, the cost of the disk array device 10 can be reduced.

Furthermore, since the output currents are caused to reach an equilibrium among the battery boxes 60, a stable, substantially constant output current can be obtained even in cases where the specifications or electrical characteristics differ among the battery boxes 60, so that utilization as a backup power supply is possible.

Furthermore, since the output currents are caused to reach an equilibrium among the battery boxes 60, the amounts of discharge energy of the battery boxes 60 can also be made substantially uniform. Accordingly, variation in the discharge depth of the battery boxes 60 can be suppressed, so that variation in the time required for discharge can also be suppressed. As a result, for example, even in cases where the electrical characteristics of the battery boxes 60 vary as a result of difference in the maker, use period, use environment or the like, utilization as a stable auxiliary power supply is possible, and the discharge time can also be substantially fixed, so that the reliability can be improved even further.

Furthermore, in the present embodiment, the battery cells (corresponding to the battery circuits 64A and 64B in FIG. 3) are constructed using nickel-hydrogen secondary cells 610. Such nickel-hydrogen secondary cells 610 possess advantages compared to lead secondary cells, e.g., a reduction in size is possible, there is no deleterious effect on the environment (since lead is not used), a large current can easily be obtained, and the like. Conversely, nickel-hydrogen secondary cells 610 also suffer from disadvantages compared to lead secondary cells in that such nickel-hydrogen secondary cells are more expensive, it is difficult to strike a balance in output current among the battery boxes 60 (the variation in the electrical characteristics is large), the useful life tends to be reduced unless the temperature of the battery cells is maintained at a substantially constant temperature, and the like. In the present embodiment, since a control function that causes the output currents among the battery boxes 60 to reach an equilibrium is respectively provided in each battery box 60, the battery boxes can be used with the variation in electrical characteristics suppressed. Furthermore, since the peak values of the output currents can be made substantially constant, the rated power values required in parts such as connectors, cables and the like can be reduced, so that the cost of parts can be reduced.

Accordingly, the increase in the cost caused by the use of nickel-hydrogen secondary cells 610 can be offset to some extent by the reduction in the cost of other electrical parts, so that the reliability of the disk array device 10 can be increased while suppressing an increase in the total cost of the power supply system.

Furthermore, in the present embodiment, as is shown in FIG. 4, a construction is used in which air intake ports 62 are formed in both side surfaces of the battery boxes 60, and in which the opening area of the air intake ports 62 is varied in accordance with the flow-through path of the cooling air. Accordingly, for example, as a result of the air intake ports 62 being formed so that the opening area increases moving from the upstream side toward the downstream side, the battery cells disposed inside the battery boxes 60 can be cooled in a substantially uniform manner. As a result, temperature differences caused by the installation positions of the battery cells can be reduced, so that variation in the deterioration according to temperature can be suppressed.

2. Second Embodiment

A second embodiment of the present invention will be described with reference to FIGS. 10 and 11. The characterizing feature of this embodiment is that an output controller 670 that is used to control the operation of the discharge circuit 650A is provided, and the system is devised so that the discharge circuit 650A is operated with the temperature of the battery cells being taken into account. Furthermore, the embodiments described below, including this embodiment, correspond to modifications of the first embodiment.

Figure 10:
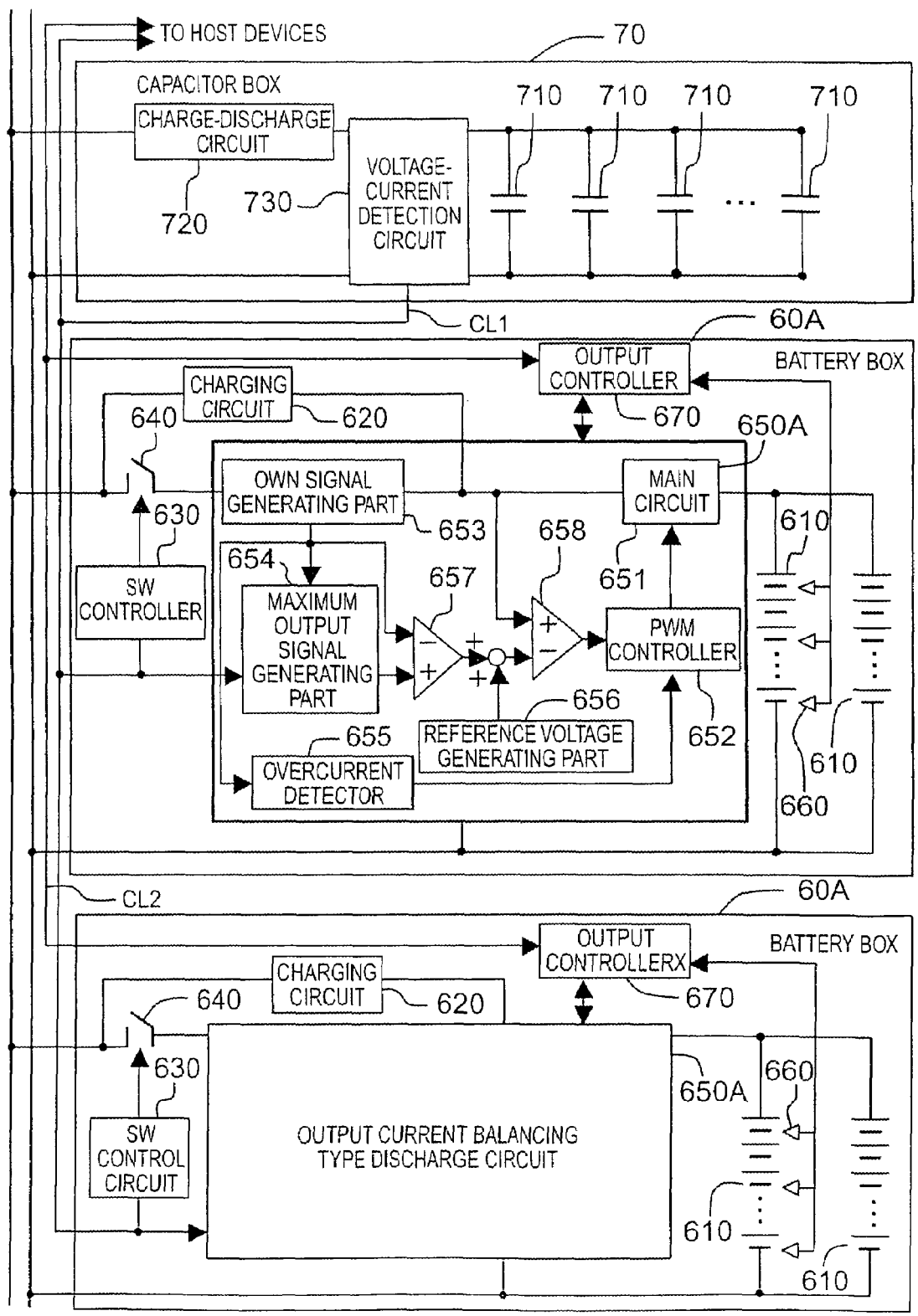
FIG. 10 is a circuit diagram of the power supply relationship in a second embodiment.

FIG. 10 is a circuit diagram that focuses on the power supply circuit of the disk array device 10. Because of space limitations, the symbol "51" of the power supply common bus is omitted; however, the two thick lines at the left end of the figure express this power supply common bus 51.

The battery boxes 60A of this embodiment have the same construction as in the first embodiment; however, this embodiment differs from the first embodiment in that a temperature sensor 660 and output controller 670 are further provided. A plurality of these temperature sensors 660 may be installed. For example, one temperature sensor 660 may be installed for each battery cell, or temperature sensors 660 may be installed only on arbitrary or specified battery cells. Alternatively, a plurality of temperature sensors may be provided for one battery cell. Furthermore, a construction may also be used in which a plurality of temperature sensors 660 are provided for certain battery cells, while only a single temperature sensor 660 is provided for other battery cells.

For example, the temperature sensors 660 can be constructed as thermocouples, temperature measuring resistors, semiconductor temperature sensors or the like. The temperature sensors 660 respectively detect the temperatures of the battery cells, convert the detected cell temperatures into electrical signals, and output these signals to the output controller 670.

The output controller 670 is a higher controller that is used to control the operation of the discharge circuit 650A; for example, this output controller 670 can be constructed as a micro-computer system. Furthermore, the output controller 670 can also be constructed as a logical circuit that does not comprise a micro-computer.

Output controllers 670 are connected to each other via a second control line CL2. Furthermore, the output controllers 670 are also connected to at least CHAs 110 or DKAs 120 corresponding to host devices via the control line CL2.

Furthermore, the SVP 160 shown in FIG. 5 can perform communications with the output controllers 670 via at least the CHAs 110 or DKAs 120. Furthermore, the management terminal M1 can perform monitoring of the states of the output controllers 670 via the SVP 160, and can send necessary commands.

On the basis of the detection signals (cell temperatures) from the temperature sensors 660, the output controllers 670 can grasp the states of the battery cells. As will be described later, in cases where the cell temperatures exceed a specified temperature, the output controllers 670 instruct the discharge circuits 650A to stop the balancing control of the output currents. When the discharge circuits 650A receive a control stop command, for example, these discharge circuits 650A stop the output current balancing control by cutting off the output of the first operational amplifier 657 from the input of the second operational amplifier 658.

Figure 11:
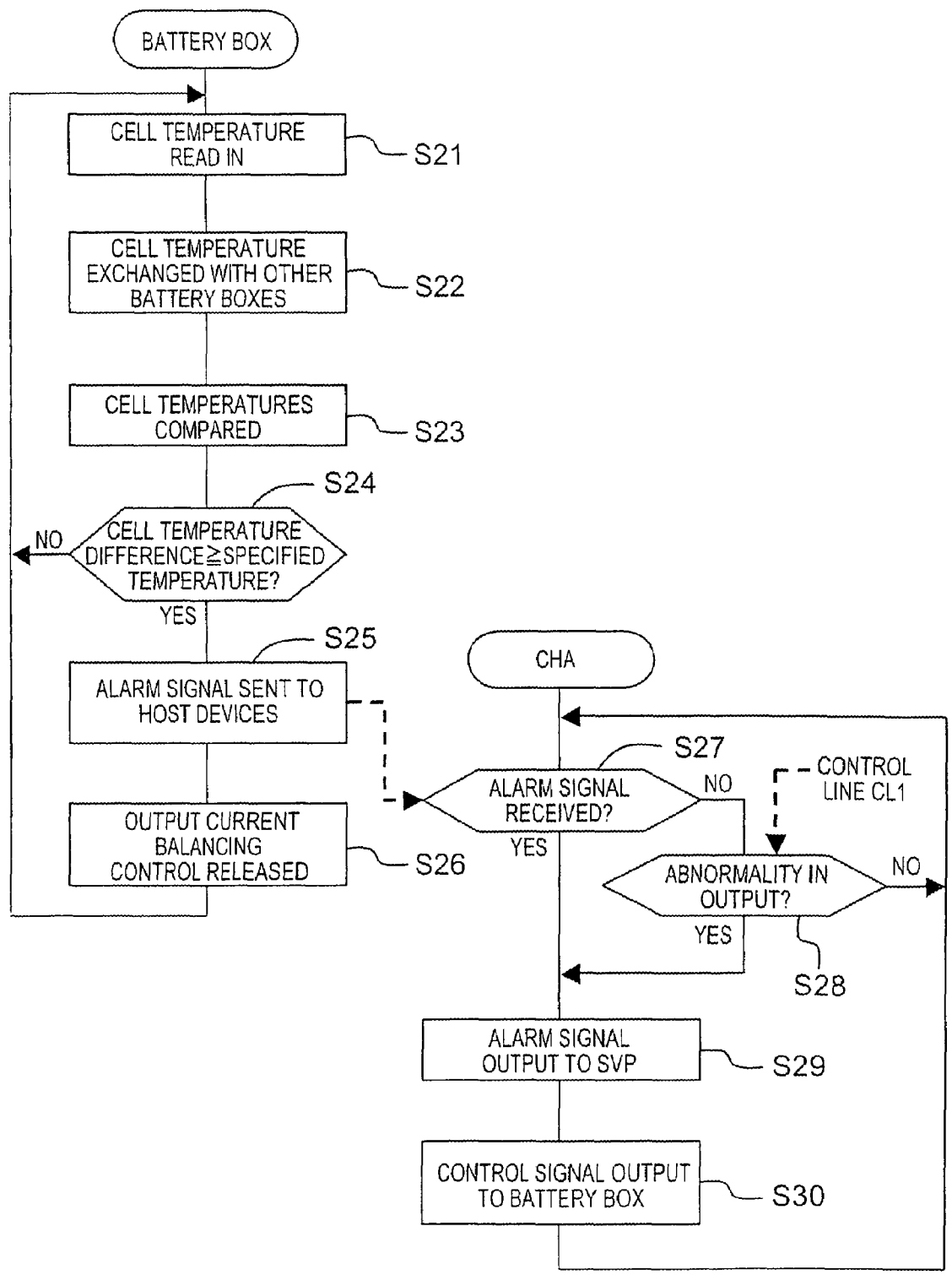

FIG. 11 is a flow chart which shows an outline of the auxiliary power supply control processing performed by the battery boxes 60A and CHAs 110. First, the output controller 670 reads in the cell temperatures from the temperature sensors 660 (S21). Next, the output controller 670 exchanges cell temperatures with the other's output controllers 670 (S22).

Then, the output controller 670 compares the other cell temperatures with the temperature of its own battery cells (S23), and judges whether or not the difference with the other cell temperatures exceeds a specified temperature (S24). In cases where the difference in battery cell temperatures among the battery boxes 60 is within a specified temperature [range] (S24:NO), no abnormal event has occurred; accordingly, the processing returns to S21, and monitoring of the cell temperatures is continued.

In cases where the difference with other cell temperatures exceeds a specified temperature (S24: YES), it may judged that this is a case in which the battery cell in question is outputting a large current, and has been placed in an overheated state. Accordingly, the output controller 670 transmits an alarm signal to the CHA 110 (as a host device), and notifies the CHA 110 of the occurrence of an overheated state (S25). Furthermore, the output controller 670 instructs the discharge circuit 650A to stop the balancing control of the output current (S26). As a result, the discharge circuit 650A outputs a current on the basis of the difference between the target voltage given by the reference voltage generating part 656 and its self-output voltage, without being influenced by the output current values of other battery boxes 60.

When the CHA 110 receives an alarm signal from the output controller 670 (S27: YES), the CHA 110 transmits an alarm signal to the SVP 160 (S29). Furthermore, the CHA 110 transmits the necessary control signal to the output controller 670 that generated the alarm signal (S30). For example, the CHA 110 can send an instruction that completely stops the operation of the battery box 60A that has the battery cell that is in an overheated state, or that further lowers the target value of the output current or the like.

Furthermore, the CHA 110 monitors the output current values of the respect battery boxes 60 via the first control line CL1. Accordingly, even in cases where the CHA 110 has not receive an alarm signal from any of the battery boxes 60A (S27: NO), the CHA 110 can judge whether or not an abnormality has occurred in the output current on the basis of the signal from the control line CL1 (S28). For example, in cases where an excessively large current appears on the control line CL1 in spite of the fact that this is a period in which a large current is not being output from the capacitor box(es) 70, this is judged to be an output abnormality (S28:

YES), so that an alarm signal can be transmitted to the SVP 160 (S29). In this case, for example, the CHA 110 can instruct the battery boxes 60A to lower the output current values.

Furthermore, in FIG. 11, there is a focus on the exchange of cell temperatures among the battery boxes 60A, and the cell temperature difference among the battery boxes 60A. However, the present invention is not limited to this. For example, it would also be possible to use a construction in which a preset upper limit temperature is compared with the cell temperature, and an alarm signal is output or the balancing control of the output currents is interrupted in cases where the current cell temperature exceeds the upper limit temperature. In this case, the upper limit temperature may be set as a common value that is shared by the battery boxes 60A, or individual values may be set with consideration given to the use states of the battery boxes 60A or the like.

Furthermore, a construction may also be used in which temperature monitoring is performed in two stages, i.e., a comparison of cell temperatures among the battery boxes 60A and a comparison of the cell temperatures with upper limit temperatures that are respectively set for the battery boxes 60A.

Since the present embodiment is constructed as described above, the same effects as those in the first embodiment can be obtained. In addition, in the present embodiment, temperature sensors 660 that detect the temperatures of the battery cells and output controllers 670 that either stop or permit output current balancing control of the discharge circuits 650A on the basis of the temperatures of the battery cells are provided. Accordingly, in the present embodiment, a decrease in the useful life due to the battery cells reaching a high temperature can be suppressed. Furthermore, since a decrease in the useful life of the battery cells can be suppressed, the destage control period P2 and memory backup period P3 can be respectively set as longer periods, so that the reliability of data backup during abnormal operation of the main power supply can be increased even further.

In the present embodiment, a construction is use in which alarm signals can be transmitted from the output controllers 670 to the CHAs 110 (or DKAs 120). Accordingly, the SVP 160 and management terminal M1 can be notified of the states of the battery boxes 60A by the CHAs 110, and output control of the auxiliary power supply can be performed with consideration given to the overall conditions of the disk array device 10. For example, in cases where an alarm signal is generated, the disk array device 10 can limit the number of disk drives 21 used, thus lowering the load, and can then issue an instruction to lower the output current values of the battery boxes 60A. Alternatively, in cases where an abnormality occurs in any of the battery boxes 60A, the disk array device 10 can switch the operating mode during auxiliary power supply operation so that there is a shift from the destage control operation to the memory backup operation or the like.

In the present embodiment, a decrease in the useful life of the battery boxes 60A can be suppressed by connecting a construction in which the output current balancing control is either operated or stopped on the basis of the battery cell temperature, and a construction relating to the method used to form the air intake ports 62 in the battery boxes 60A. Specifically, the former construction makes it possible to prevent overheating of the battery cells beforehand, while the latter construction makes it possible to reduce the temperature differences among the battery cells inside the same battery box 60A. Accordingly, as a result of the connection of this electrical construction and mechanical construction, a decrease in the useful life caused by temperature variations in the battery cells can be suppressed.

3. Third Embodiment

A third embodiment [of the present invention] will be described with reference to FIGS. 12 through 15. One characterizing feature of the present embodiment is as follows: namely, in the instantaneous power outage holding period in which an instantaneous large power is required, variation in the output among the battery boxes 80 is positively utilized, while in the destage control period and memory backup period in which a stable long-term power supply is required, control is performed so that the variation in the output among the battery boxes 80 is suppressed.

Figure 12:
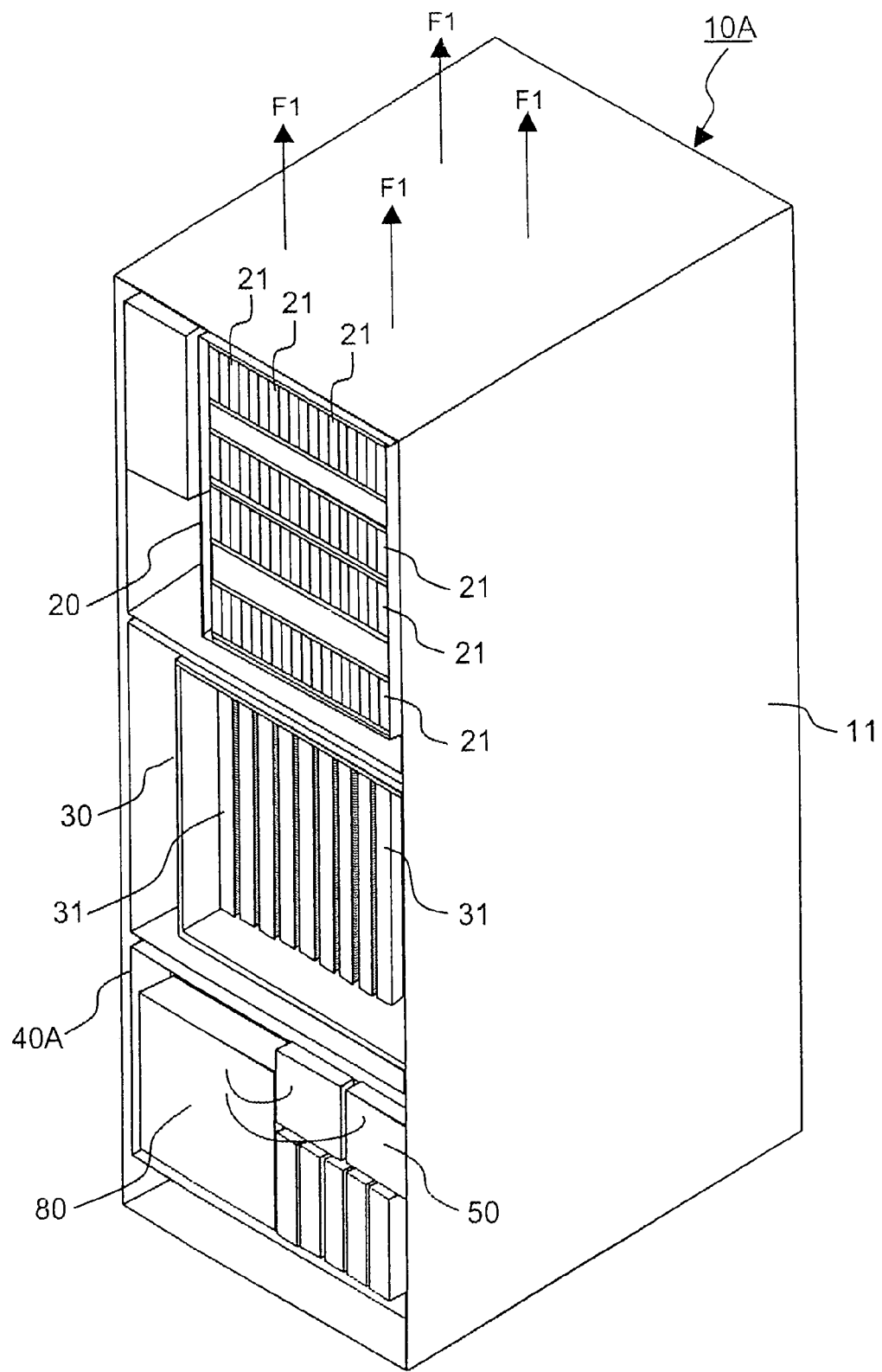
FIG. 12 is an external view of the disk array device of a third embodiment.

FIG. 12 is an external view of the disk array device 10A of this embodiment. Like the disk array device 10 of the first embodiment, this disk array device 10A comprises a memory part 20, controller 30 and power supply 40A. However, the power supply 40A of this disk array device 10A comprises a plurality of separate battery boxes 80 that differ from the battery boxes 60 of the abovementioned embodiments. Furthermore, in FIG. 1, the system is shown as though there were a single box; in actuality, however, a plurality of boxes are present.

Figure 13:
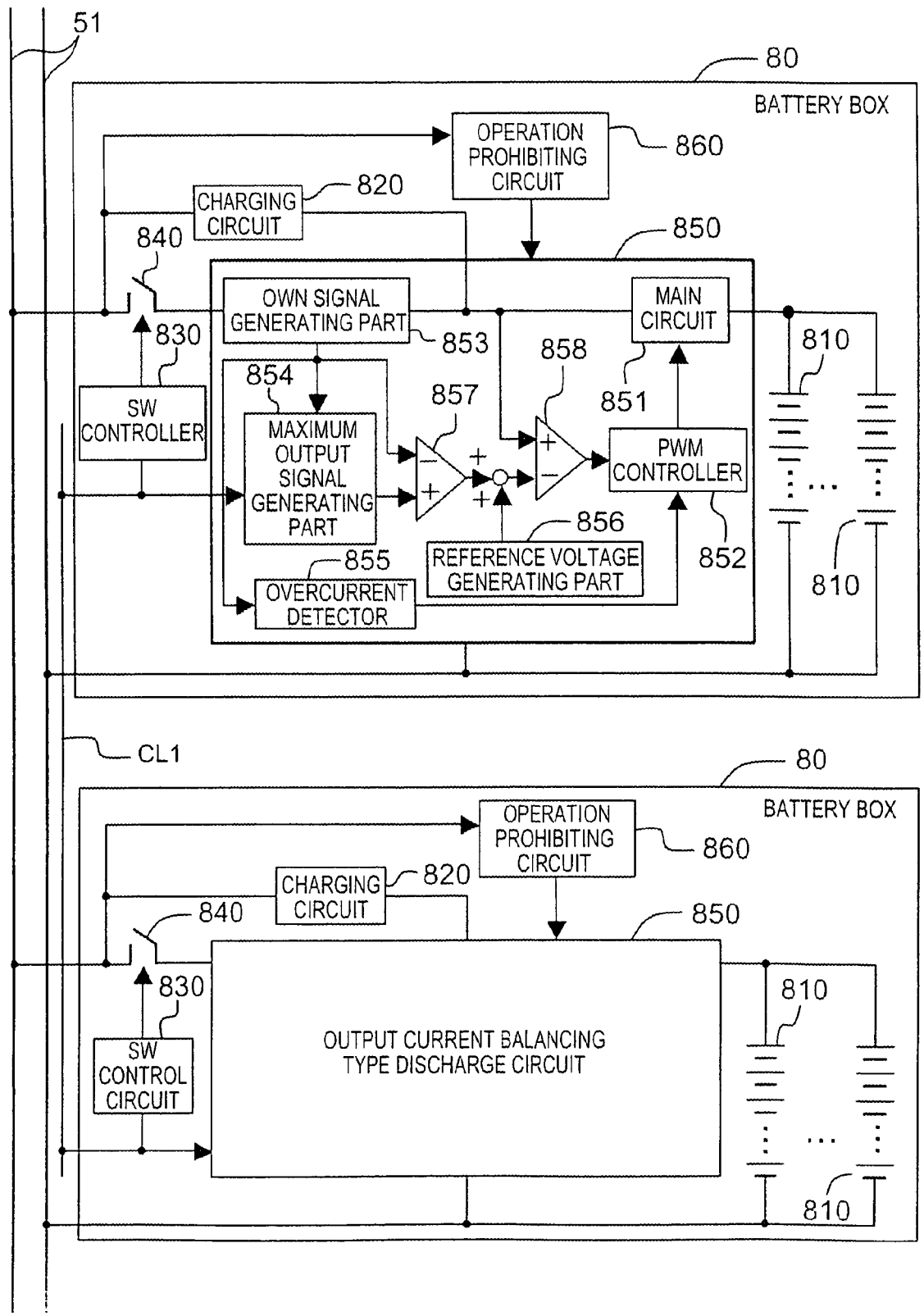
FIG. 13 is a circuit diagram of the power supply relationship.

FIG. 13 is a circuit diagram that focuses on the power supply circuit. Each battery box 80 comprises a plurality of secondary cells 810, a charging circuit 820, a switching control circuit 830, a discharge control switch 840, a discharge circuit 850 and an operation prohibiting circuit 860.

For example, the secondary cells 810 can be constructed from lead secondary cells, nickel-cadmium secondary cells, nickel-hydrogen secondary cells, fuel cells or the like. In the present embodiment, a description will be given regarding secondary cells of a different type than the secondary cells 610 of the first embodiment. Furthermore, for example, a single battery cell is constructed by connecting a plurality of secondary cells 810 in series, and a plurality of these battery cells are connected in parallel.

The charging circuit 820, switching control circuit 830, discharge control switch 840 and discharge circuit 850 respectively correspond to the charging circuit 620, switching control circuit 630, discharge control switch 640 and discharge circuit 650 described in the first embodiment, and realize the same functions as these parts; accordingly, a description is omitted.

The discharge circuit 850 comprises a main circuit 851, PWM control circuit 852, own-signal generating part 853, maximum output signal generating part 854, overcurrent detector 855, reference voltage generating part 856, first operational amplifier 857, and second operational amplifier 858. These parts 851 through 858 respectively correspond to the parts 651 through 658 of the discharge circuit 650 described in the first embodiment, and realize the same functions; accordingly, a description is omitted.

The operation prohibiting circuit 860 is a control circuit that is used to instruct the discharge circuit 850 to prohibit the operation of output current balancing control. As will be described later, the operation prohibiting circuit performs a monitoring function in order to ascertain whether or not the outputs of the AC/DC power supplies 50 have dropped below a specified value. In cases where the occurrence of an instantaneous power outage is detected, the operation prohibiting circuit 860 outputs a control signal to the discharge circuit 850, and causes the execution of output current balancing control to be prohibited for a specified period of time. Then, when the instantaneous power outage holding period has elapsed so that there is a shift to the next operating mode, the operation prohibiting circuit 860 releases the command that prohibits output current balancing control.

Figure 14:
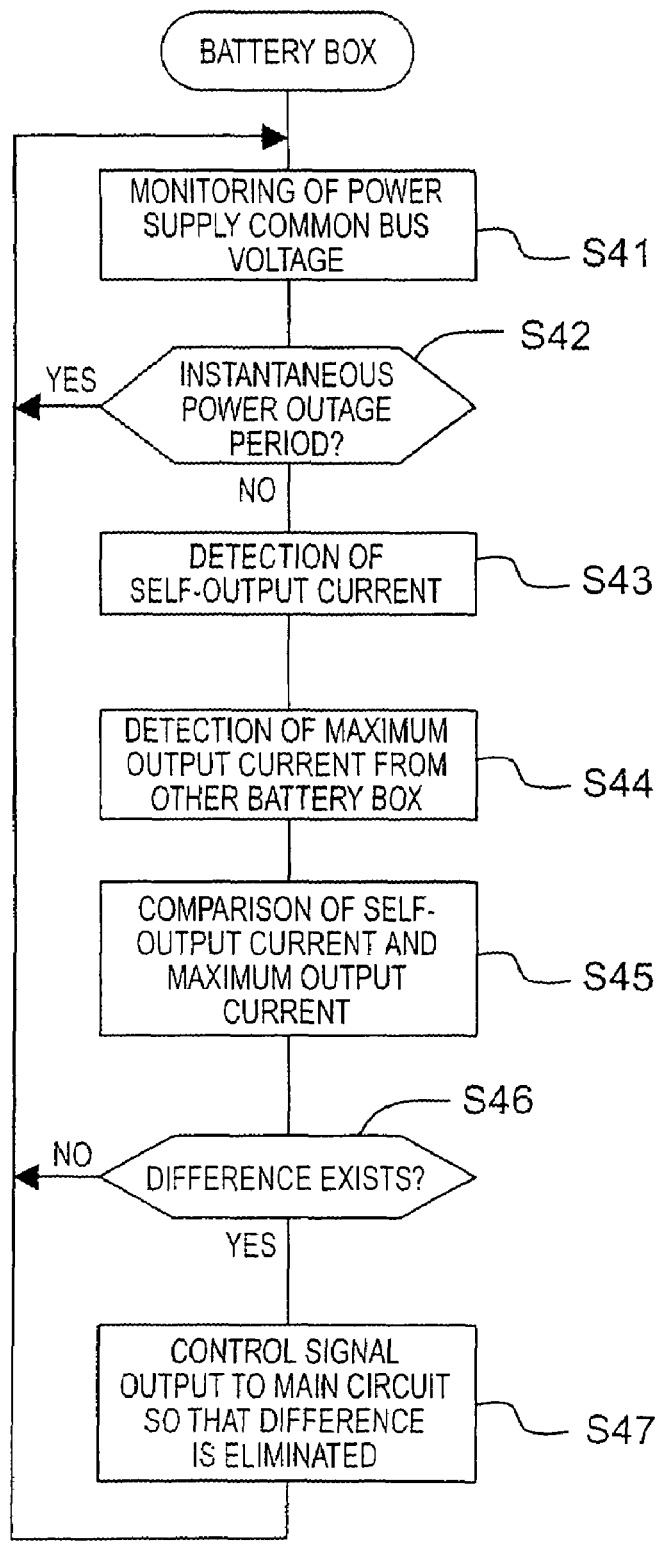
FIG. 14 is flow chart showing the output control processing of the battery box.

FIG. 14 is a flow chart which shows an outline of the auxiliary power supply control processing of the present embodiment. [Each] battery box 80 monitors the voltage of the power supply common bus 51 (S41), and judges whether or not the system is an instantaneous power outage period (S42). To describe this in greater detail, in cases where the voltage of the power supply common bus 51 drops below a specified value, it is judged that an instantaneous power outage has occurred, and a timer (not shown in the figures) is started. Then, the time period required for this timer to count a specified time (instantaneous power outage holding period) is judged to be an instantaneous power outage holding period.

In cases where the system is in an instantaneous power outage holding period (S42: YES), the battery box 80 does not perform output current balancing control (S43 through S47), but instead repeats S41 and S42. On the other hand, in cases where a specified time has elapsed following the start of the instantaneous power outage (S42: NO), the battery box 80 initiates output current balancing control in the same manner as in the first embodiment. Specifically, [the battery box 80] detects its self-output current value and the maximum output current value on the control line CL1 (S43, S44), and compares its self-output current value and this maximum output current value (S45). Then, in cases where there is a difference between these two current values (S45: YES), the main circuit 851 is controlled so that this difference is eliminated (S47).

Figure 15:
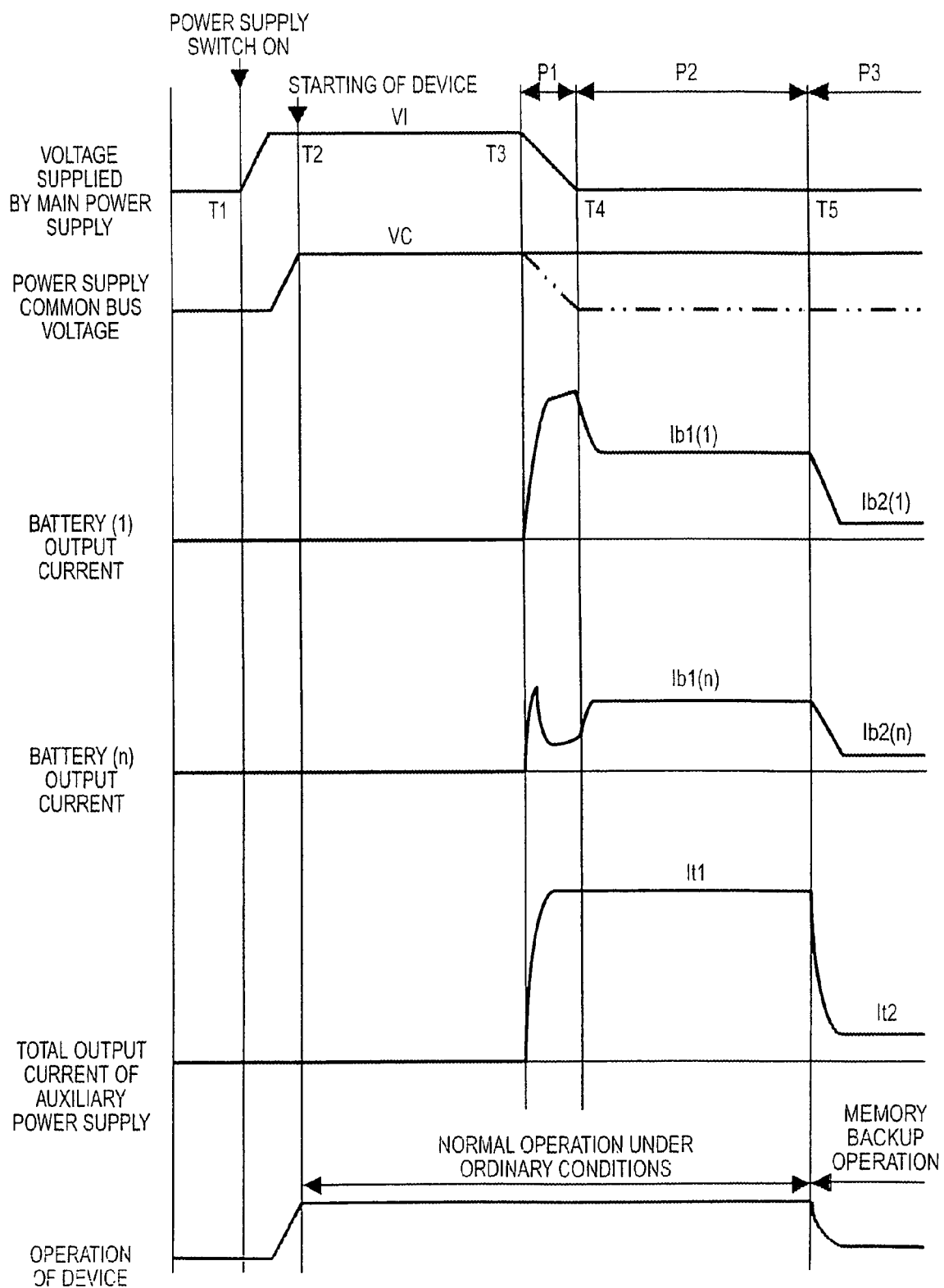
FIG. 15 is a timing chart of power supply backup.

As is indicated in the timing chart shown in FIG. 15, the battery box 80 does not perform output current balancing control during the instantaneous power outage holding period P1. Accordingly, each battery box 80 outputs a current in accordance with the electrical characteristics (impedance and the like). Consequently, during the instantaneous power outage holding period P1, the battery boxes 80 output currents of respectively different current values.

However, if the output currents of the battery boxes 80 are viewed on the whole, a specified maximum current can be obtained for a specified short time as indicated by the total output current It in FIG. 15. The possibility of obtaining a specified large current during the instantaneous power outage holding period P1 is accordingly increased as the variation in electrical characteristics among the battery boxes 80 increases.

On the other hand, during the destage control period P2 and memory backup period P3, the battery boxes 80 initiate output current balancing control. As a result, a stable current can be supplied to the power supply common bus 51 over a long period of time.

Since the present embodiment is constructed as described above, the same effects as those of the first embodiment can be obtained. In addition, in the present embodiment, a construction is used in which output current balancing control of the battery boxes 80 is not performed during the instantaneous power outage holding period P1, and the variation in the electrical characteristics among the battery boxes 80 is [instead] positively utilized. Accordingly, a holding operation in the case of an instantaneous power outage can be realized without using capacitor box(es) 70; furthermore, the destage control operation and memory backup operation can also be smoothly performed.

4. Fourth Embodiment

Figure 16:
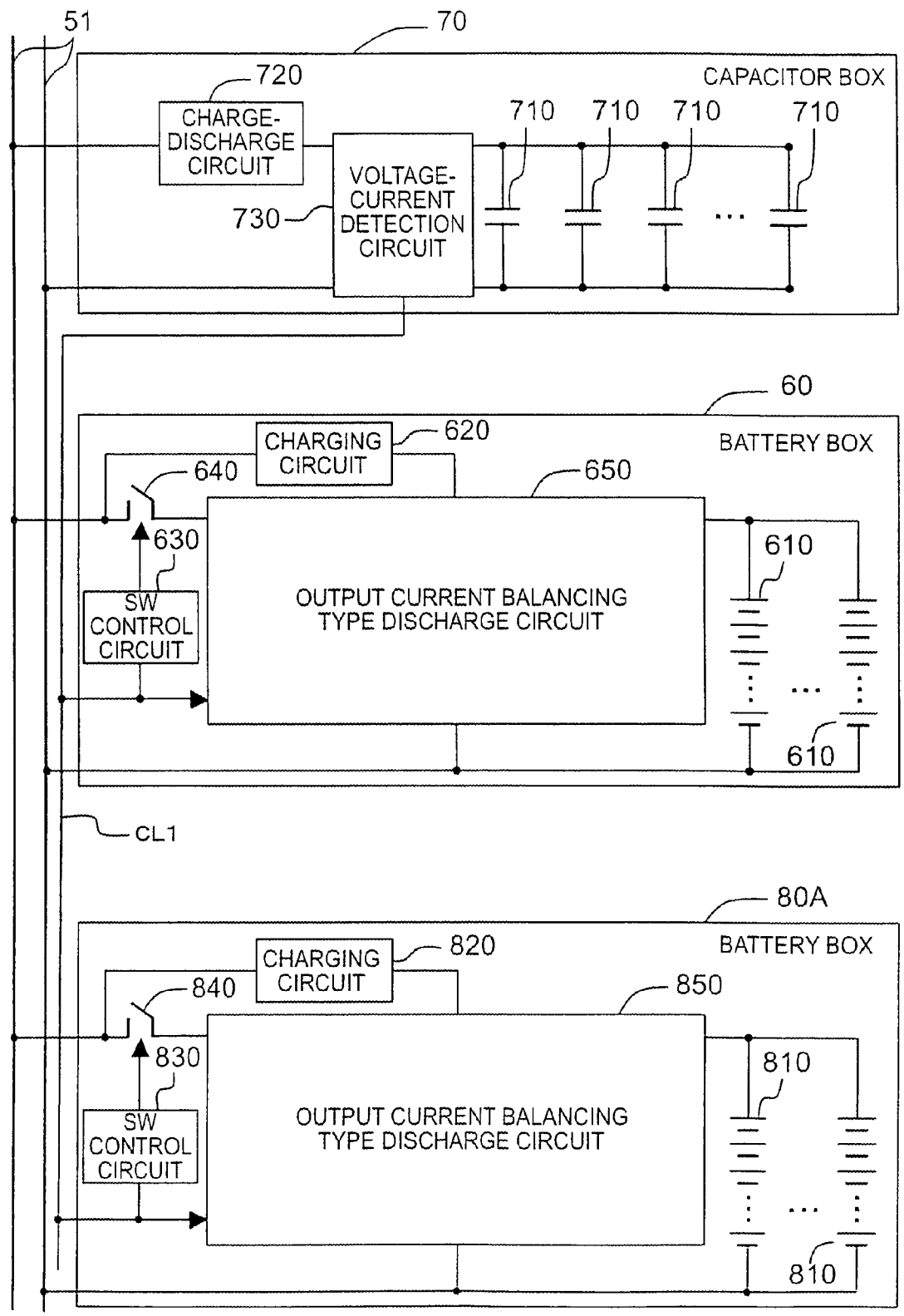
FIG. 16 is a circuit diagram of the power supply relationship in a fourth embodiment.

FIG. 16 is a circuit diagram of a fourth embodiment [of the present invention]. One characterizing feature of the present embodiment is that battery boxes 60 and 80A of different types are used in combination. For example, one [type of] battery box 60 comprises battery cells consisting of nickel-hydrogen secondary cells 610, while the other [type of] battery box 80A comprises battery cells of another type consisting of nickel-cadmium secondary cells 810 or the like.

Thus, even in cases where battery boxes 60 and 80A of respectively different types are mixed, the battery boxes 60 and 80A respectively perform output current balancing control; accordingly, a stable current can be supplied to the power supply common bus 51.

5. Fifth Embodiment

A fifth embodiment [of the present invention] will be described with reference to FIGS. 17 through 19. One characterizing feature of the present embodiment is that battery boxes 60 are respectively disposed on both sides of capacitor boxes 70, and these capacitor boxes 70 are utilized as common air ducts (cooling air passages).

Figure 17:
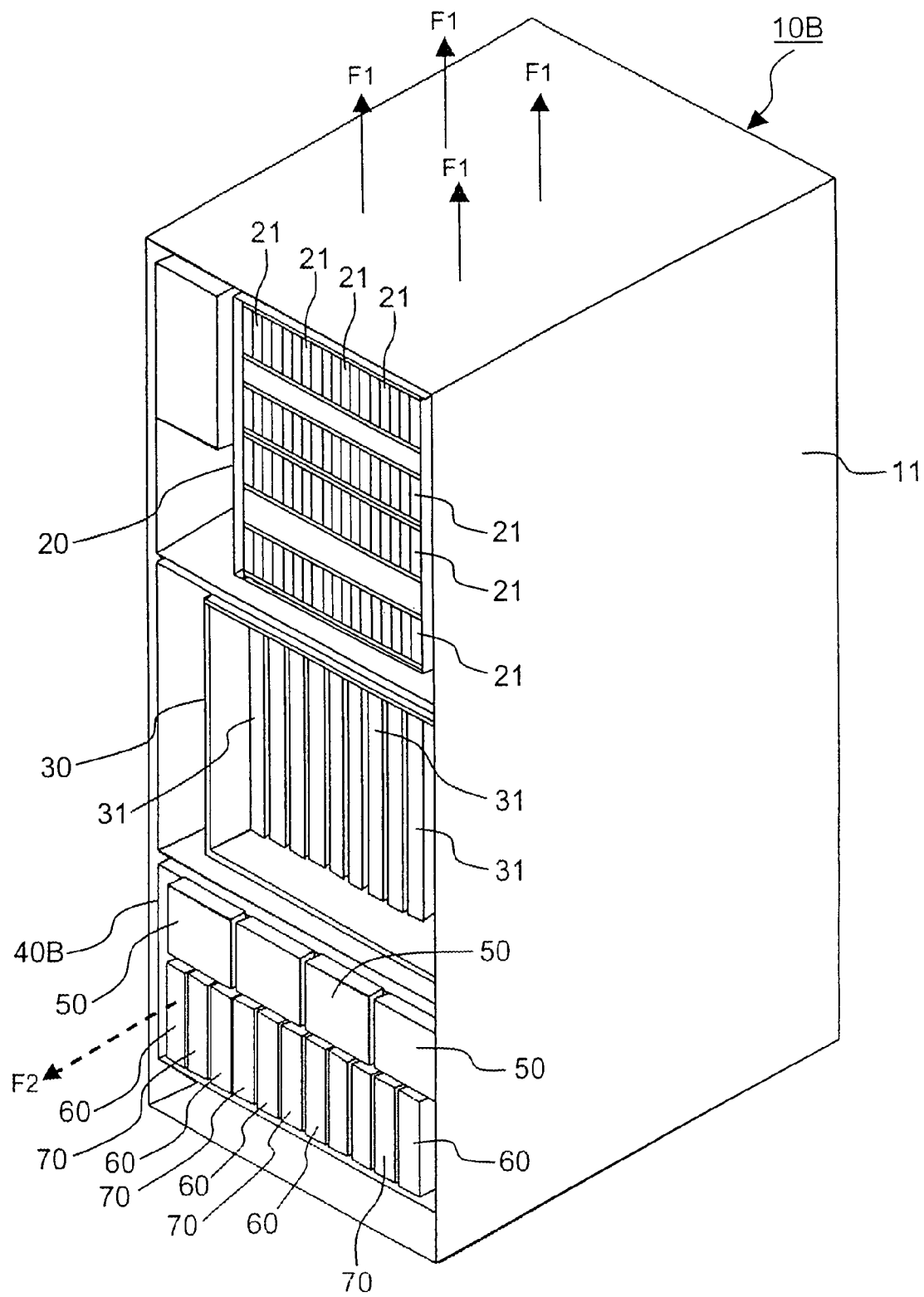
FIG. 17 is an external view of the disk array device according to a fifth embodiment.

FIG. 17 is an external view of this disk array device 10B. Like the disk array device 10 described in the first embodiment, this disk array device 10B comprises a memory part 20, controller 30 and power supply 40B. Furthermore, the power supply 40B comprises AC/DC power supply(s) 50, a plurality of battery boxes 60, and a plurality of capacitor boxes 70.

Figure 18:
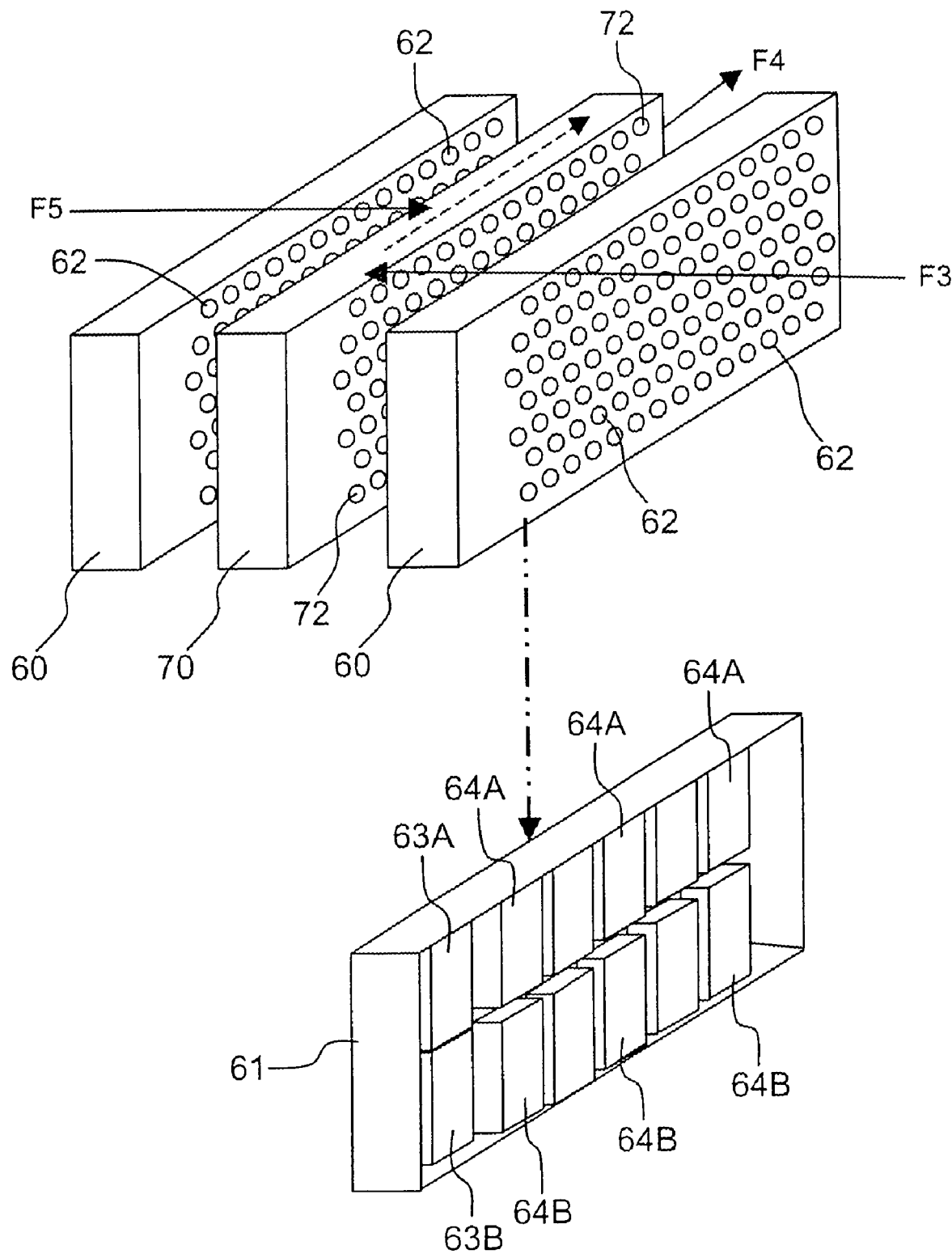
FIG. 18 is a perspective view of the battery box and capacitor box.

FIG. 18 is a schematic perspective view showing the disposition relationship and the like of the battery boxes 60 and capacitor boxes 70. Respective battery boxes 60 are disposed so as to clamp the capacitor boxes 70 from both sides. Here, the battery boxes 60 comprise cooling fans 65A and 65B as shown in FIG. 3.

Figure 19:
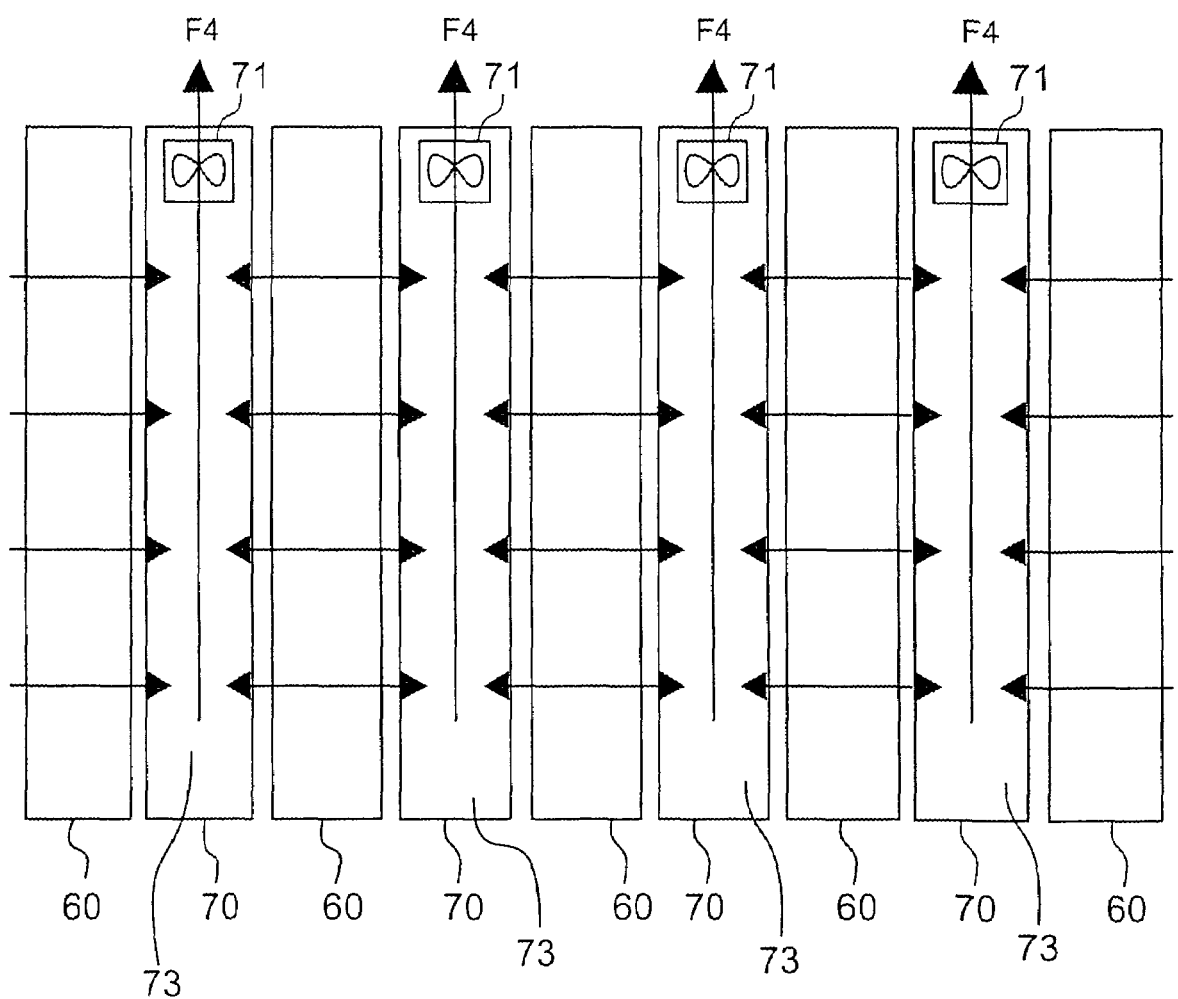
FIG. 19 is an explanatory diagram which shows in model form the flow of the cooling air that flow through the battery boxy and capacitor box.

On the other hand, as is shown in FIG. 19, the capacitor boxes 70 each comprise a cooling fan 71. Furthermore, in the capacitor boxes 70, a plurality of air intake ports 72 are respectively formed in both side surfaces on which the battery boxes 60 are disposed.

When the cooling fans 71 of the capacitor boxes 70 operate, a pressure difference is generated. As a result, in the battery boxes 60 that are positioned on both sides of the capacitor boxes 70, outside air passes through the air intake ports 62, and is introduced into the battery boxes 60 from the direction indicated by the arrow F3 and the direction indicated by the arrow F5. The air that flows into the battery boxes 60 captures heat from the control circuits 63A and 63B and battery circuits (battery cells) 64A and 64B, and flows out via the air intake ports 62 on the opposite sides.

The air that has flowed out to the outside from the battery boxes 60 flows into the capacitor boxes 70 via the air intake ports 72 of the capacitor boxes 70. A plurality of capacitors 710 are disposed inside the capacitor boxes 70. Here, under ordinary circumstances, the mounting density inside the capacitor boxes 70 is relatively low compared to the mounting density of the battery cells inside the battery boxes 60. Differences are generated in the mounting density according to differences in the shape of the battery cells and shape of the capacitors, differences in the external dimensions of the battery cells and external dimensions of the capacitors, and the like.

Accordingly, compared to the interiors of the battery boxes 60, a larger space that allows the flow of a cooling air is ensured in the interiors of the capacitor boxes 70. The cooling air that flows into the capacitor boxes 70 flows through internal spaces 73 toward the cooling fans 71 while capturing heat from the capacitors 710, and is discharged into the cooling air passage inside the housing 11 from the cooling fans 71 (in the direction indicated by the arrow F4 in FIG. 19).

Furthermore, as is shown in FIG. 4, the opening areas of the air intake ports 62 and 72 can be respectively varied in accordance with the flow-through direction of the cooling air.

Thus, in the present embodiment, a construction is used in which the respective parts are disposed so that both sides of the capacitor boxes 70, which have a relatively low mounting density so that an extra amount of internal space is available, are clamped by the battery boxes 60, and cooling fans 71 are disposed inside the capacitor boxes 70. Accordingly, the internal spaces 73 of the capacitor boxes 70 can also be used as common cooling air passages, so that a larger cooling air can be taken into the battery boxes 60, thus making it possible to cool the battery cells.

Furthermore, in the present embodiment, since capacitor boxes 70 are disposed between the battery boxes 60, the battery boxes 60 other than the battery boxes 60 that are positioned on both outside ends can utilize the capacitor boxes 70 that are respectively positioned on both sides of these battery boxes 60 as cooling mechanisms.

Furthermore, in the present embodiment, since the battery boxes 60 are partitioned by the capacitor boxes 70, the capacitor boxes 70 can be used as heat transfer insulating mechanisms. Accordingly, even in cases where a certain battery box 60 is heated to a high temperature for some reason, the transfer of this high temperature to other battery boxes 60 can be prevented.

Thus, as a result of capacitor boxes 70 being utilized as common cooling mechanisms for a plurality of battery boxes 60, and as a result of these capacitor boxes 70 being utilized as heat transfer insulating mechanisms between adjacent battery boxes 60, the elevation in the temperature of the battery boxes 60 can be reduced. Accordingly, the temperature elevation of the battery cells can be suppressed, so that a decrease in the useful life of the battery cells can be prevented. As a result, the operable periods (P2 and P3) of the destage control operation and memory backup operation can be lengthened.

Furthermore, the present invention is not limited to the embodiments described above. A person skilled in the art can make various additions, modifications and the like. For example, various embodiments may be appropriately combined.

What is claimed is:

1. A disk array device comprising:
   a host interface controller that controls the exchange of data with host devices;
   a slave interface controller that controls the exchange of data with slave devices;
   a memory part that is shared by said host interface controller and said slave interface controller;
   a power supply line connected respectively to said host interface controller, said slave interface controller and said memory part;
   a main power supply that is connected to said power supply line, and that supplies power to the power supply line;
   a plurality of first auxiliary power supplies that are respectively connected to said power supply line to receive power from said main power supply during normal operation of the main power supply, and that respectively supply auxiliary power to said power supply line when said main power supply fails to provide power to said power supply line; and
   a controller that performs a control action so that the outputs of said respective first auxiliary power supplies are substantially uniform.

2. The disk array device according to claim 1, wherein said controller comprises separate controllers that are respectively disposed in said first auxiliary power supplies, and a control line for connecting these respective separate controllers, and
   said separate controllers share a control signal via said control line so as to respectively control the outputs of said first auxiliary power supplies in which the controllers themselves are disposed, whereby the outputs among said first auxiliary power supplies are substantially uniform.

3. The disk array device according to claim 2, wherein said separate controllers each comprise an self-output monitoring part that monitors the output of said first auxiliary power supply in which the subject controller is disposed, an other's output monitoring part that detects said control signal that is input via said control line, a comparator that compares the monitoring result of said self-output monitoring part and the monitoring result of said other's output monitoring part, and an adjustment part that adjusts the output of said first auxiliary power supply in accordance with the result of the comparison performed by said comparator.

4. The disk array device according to claim 2, wherein internal state detection are respectively provided in said first auxiliary power supplies for detecting the internal states thereof, and said separate controllers control the outputs of said first auxiliary power supplies respectively with consideration given to said detected internal states.

5. The disk array device according to claim 4, wherein said first auxiliary power supplies each comprise a plurality of auxiliary power supply cells, and said internal state detectors detect the temperature of said respective auxiliary power supply cells as the internal state.

6. The disk array device according to claim 2, wherein said separate controllers are respectively connected to said host interface controller or said slave interface controller, or to both of said interface controllers.

7. The disk array device according to claim 1, wherein
   a relatively large first auxiliary power is supplied from said first auxiliary power supplies for a relatively short first backup time in a first case,
   a relatively small second auxiliary power is supplied from said first auxiliary power supplies for a relatively long second backup time in a second case, and
   a third auxiliary power that is smaller than said second auxiliary power is supplied from said first auxiliary power supplies for a third backup time that is longer than said second backup time in a third case.

8. The disk array device according to claim 7, wherein
   said first case corresponds to a state of instantaneous shutdown of said main power supply,
   said second case corresponds to a state in which data that is stored in said memory part is saved in said memory device, and
   said third case corresponds to a state in which data that is stored in said memory part is held.

9. The disk array device according to claim 7, wherein said controller performs respective control actions so that the outputs of said first auxiliary power supplies are substantially uniform in said second case and said third case.

10. The disk array device according to claim 1, wherein a second auxiliary power supply that supplies auxiliary power is disposed separately from said first auxiliary power supplies,
- a relatively large first auxiliary power is supplied from said second auxiliary power supply for a relatively short first backup time in a first case,
- a relatively small second auxiliary power is supplied from said first auxiliary power supplies for a relatively long second backup time in a second case, and
- a third auxiliary power that is smaller than said second auxiliary power is supplied from said first auxiliary power supplies for a third backup time that is longer than said second backup time in a third case.

11. The disk array device according to claim 10, wherein said controller performs respective control actions so that the outputs of said first auxiliary power supplies are substantially uniform in said first case, said second case and said third case.

12. The disk array device according to claim 10, wherein said first auxiliary power supplies comprises nickel-hydrogen secondary cells, and said second auxiliary power supply comprises a capacitor.

13. The disk array device according to claim 10, wherein said first auxiliary power supplies and said second auxiliary power supply are disposed so that both side surfaces of said second auxiliary power supply are clamped between said first auxiliary power supplies,
- said first auxiliary power supplies and said second auxiliary power supply are respectively provided with air intake ports in both side surfaces thereof along the direction of said disposition, and
- said second auxiliary power supply is provided with a cooling fan that discharges the air that flows in through said first auxiliary power supplies to the outside.

14. The disk array device according to claim 1, wherein said first auxiliary power supplies are constituted by a combination of a plurality of different types of first auxiliary power supplies.

15. The disk array device according to claim 1, wherein said first auxiliary power supplies are disposed adjacent to each other, and each comprise air intake ports formed in both side surfaces along the direction of this disposition, and a cooling fan that discharges the air taken in from these air intake ports to the outside, and the area of said air intake ports is set in accordance with the flow-through path of the cooling air.

16. A method for controlling the battery output of a disk array device comprising:
- a host interface controller that controls the exchange of data with host devices;
- a slave interface controller that controls the exchange of data with slave devices;
- a memory part that is shared by said host interface controller and said slave interface controller;
- a power supply line connected respectively to said host interface controller, said slave interface controller and said memory part;
- a main power supply that is connected to said power supply line, and that supplies power to these power supply line; and
- a plurality of battery devices that are connected to said power supply line to receive power from said main power supply during normal operation of the main power supply, and that respectively supply auxiliary power to said power supply line line when said main power supply fails to provide power to said power supply line;
- wherein control is performed so that the outputs of said battery devices are substantially uniform among the battery devices.

17. The battery output control method for a disk array device according to claim 16, wherein
- a relatively large first auxiliary power is supplied from said battery devices for a relatively short first backup time in a first case,
- a relatively small second auxiliary power is supplied from said battery devices for a relatively long second backup time in a second case,
- a third auxiliary power that is smaller than said second auxiliary power is supplied from said battery devices for a third backup time that is longer than said second backup time in a third case,
- control is performed so that the outputs of said battery devices are substantially uniform among said battery devices in said second case and said third case, and
- said first auxiliary power is obtained by releasing the output control among said battery devices in said first case.

18. The battery output control method for a disk array device according to claim 17, wherein control is performed so that the outputs of said battery devices are substantially uniform among said battery devices in said first case, said second case and said third case.

19. The battery output control method for a disk array device according to claim 16, wherein said battery devices are each provided with an internal temperature detector that detects the internal cell temperature, and control is performed with consideration given to the detected cell temperature so that the outputs of said battery devices are substantially uniform among said battery devices.

20. The battery output control method for a disk array device according to claim 16, wherein
- said disk array device comprises a capacitor that supplies auxiliary power separately from said battery devices,
- a relatively large first auxiliary power is supplied from said capacitor device for a relatively short backup time in a first case,
- a relatively small second auxiliary power is supplied from said battery devices for a relatively long second backup time in a second case, and
- a third auxiliary power that is smaller than said second auxiliary power is supplied from said battery devices for a third backup time that is longer than said second backup time in a third case.

* * * * *